(12) United States Patent
Watanabe

(10) Patent No.: US 6,452,367 B2
(45) Date of Patent: Sep. 17, 2002

(54) MULTI-OUTPUTTING POWER SUPPLY CIRCUIT WITHOUT DUMMY LOAD RESISTOR

(75) Inventor: Kiyohiko Watanabe, Miyagi (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/859,590

(22) Filed: May 18, 2001

(30) Foreign Application Priority Data

May 19, 2000 (JP) ........................ 2000-149127

(51) Int. Cl.[7] .................. G05F 1/577; H02M 3/335
(52) U.S. Cl. ...................... 323/267; 363/21.06
(58) Field of Search ........................ 323/267, 266; 363/21.04, 21.06; 307/11, 38

(56) References Cited

U.S. PATENT DOCUMENTS 6,130,828 A * 10/2000 Rozman ................ 363/21
6,297,970 B2 * 10/2001 Hemena et al. .......... 363/21.06

OTHER PUBLICATIONS

T. Zaitsu et al., "DC–DC Converter with High Efficiency", NEC, vol. 51 No. 4, 1998, pp. 86–91.

* cited by examiner

*Primary Examiner*—Adolf Deneke Berhane
(74) *Attorney, Agent, or Firm*—McGinn & Gibb, PLLC

(57) ABSTRACT

A main-output circuit section includes a synchronous rectifying circuit composed of a NMOS, therefore, even if a load RL1 become light, a rise of direct current output voltage is prevented without a dummy resistor and electric dummy circuit, accordingly, when a NMOS is in an ON state, an abrupt narrowing of a time width does not occur. Therefore the product of voltage and time is ensured, direct current output voltage is easily produced stably.

28 Claims, 14 Drawing Sheets

MULTI-OUTPUTTING POWER SUPPLY CIRCUIT WITHOUT DUMMY LOAD RESISTOR

BACKGROUND OF THE INVENTION

1. Field of the Invention

The present invention relates to a multi-outputting power supply circuit including a main-output circuit section and at least one sub-output circuit section, and more particularly, to the multi-outputting power supply circuit, in which, the sub-output circuit section is controlled by a magnetic amplifier.

The present application claims priority of Japanese Patent Application No. 2000-149127 filed on May 19, 2000, which is hereby incorporated by reference.

2. Description of the Related Art

As shown in FIG. 11, this kind of a conventional multi-outputting power supply circuit 100 is mainly made up of an input circuit section 1, a transformer 2, a main-output circuit section 3, and a plurality of sub-output circuit sections 4, 5, . . .

The input circuit section 1 is provided with a direct current power supply section 1a, an input smoothing capacitor 1b, a PWM (Pulse width Modulation) controlling circuit 1c, and a main-switch made up of for example, an N channel type MOS transistor (hereinafter may be referred to as NMOS 1d). The transformer 2 includes a primary winding 2a connected with input circuit section 1, a plurality of secondary windings 2b, 2c, 2d, connected respectively with sub-output circuit sections 4, 5, . . . .

The main output circuit section 3 is provided with a first diode 3a, a smoothing choke coil 3b, a second diode 3c, a smoothing capacitor 3d, a dummy resistor 3e, and a constant-voltage controlling circuit 3f, thus supplying an electric power to a load RL1. The sub-output circuit section 4 is provided with a magnetic amplifier 4a, the third diode 4b, a smoothing choke coil 4c, the fourth diode 4d, a smoothing capacitor 4e, a constant-voltage controlling circuit 4f, resistors 4g and 4h, a transistor 4I, and diode 4j. The sub-output circuit section is connected to a load RL2. The sub-output circuit section 5 is the same structure as the sub-output circuit section 4, and is connected to a load RL3. And the multi-outputting power supply circuit may be provided with a electric dummy circuit 3g as shown in FIG. 12 instead of a dummy resistor 3e. The electric dummy circuit 3g is provided with a resistor 3h, a NMOS 3I, an output electric current detecting circuit 3j, and resistor 3k, and becomes ON state so as to flow dummy electric current through a resistor 3h only when a load is light.

With the above configuration, main output circuit section 3 is capable of outputting more electric power under less load variation than any sub-output power sections 4, 5, . . . .

And a duty ratio of switching in a primary side (input circuit section 1) is controlled by a negative feedback signal fed to the primary side, based on an output voltage variation of a secondary side (main output circuit section 3).

In each of sub-output circuit sections 4, 5, . . . , magnetic amplifier 4a controls an alternating current voltage having a specified duty ratio based on an output voltage fed from main output circuit section 3, hereby producing output voltage having a specified level.

Next, an operation principle of magnetic amplifier 4a will be described in detail, with reference to FIGS. 13 and 14.

FIGS. 13 and 14 are illustration for explaining an operation principle of the magnetic amplifier 4a as shown in FIG. 11.

As shown in FIG. 14, when a pulse electric current with a pulse width×μs flows, the magnetic amplifier 4a is an ON state. Here, even if the pulse electric current repeats a shifting between the ON state and an OFF state, a magnetic state of a magnetic amplifier 4a will can only go and back between a point A and a point B, in which, the point A corresponds to a maximum value of pulse current and the point B corresponds to a magnetic field zero or an electric current zero, and the magnetic amplifier 4a remains in the on state. However, while pulse electric current is the OFF state, because a slight electric current (that is to say, reset current) flows through the magnetic amplifier 4a in the opposite direction to the pulse electric current, a magnetic state of a magnetic amplifier 4a shifts to a point C, and the magnetic amplifier 4a becomes in the OFF state. In this state, even if a voltage E is supplied to the magnetic amplifier 4a in the positive direction, electric current does not flow at once, however, the electric current begins to flow after ΔT time.

ΔT is obtained by the following formula.

Magnetic flux (φ)=The product of voltage and Time (E×T)  Equation 1

ΔT=Δφ/E  Equation 2

PWM is executed by controlling the ΔT by the reset current. Here, when the following formula is satisfied, the current does not flow at all.

X=ΔT  Equation 3

That is to say, PWM is executed at range from 0 to 100 percent by adjusting a width of Δφ of magnetic amplifier 4a.

In the multi-outputting power supply circuit 100, the direct current input power voltage V1a is produced in the direct current power section 1a, and is output. The direct current input power voltage V1a is smoothed by the input smoothing capacitor 1b. A control signal V1c with a pulse width corresponding to a fixed frequency and a detective signal V3f is produced. The direct current input power voltage V1a is controlled for an ON or OFF state so as to produce an alternating current voltage V1d with a pulse width corresponding to a fixed frequency and detective signal V3f. The alternating current voltage V1d is transformed by the transformer 2 so as to produce an alternating current voltage V2b and the alternating current voltage V2c, V2d.

The alternating current voltage V2b is smoothed by the first diode 3a so as to produce a pulsating voltage V3a. Electromagnetic energy of the pulsating voltage V3a is stored in the smoothing choke coil 3b. When the first diode 3a becomes in an OFF state and the second diode 3c becomes in an ON state, the electromagnetic energy is then supplied to the smoothing capacitor 3d. The pulsating voltage V3a is smoothed by the smoothing capacitor 3d so as to produce a direct current output power voltage V3. The direct current output power voltage V3 is supplied to the dummy resistor 3e and the load RL1. When the direct current output power voltage V3 changes, the constant-voltage controlling circuit 3f detects a change of the direct current output power voltage V3 so as to produce the detective signal V3f. The detective signal V3f is supplied to the PWM controlling circuit 1c, and a pulse width of the alternating current voltage V1d is controlled for negative feed-back by the PWM controlling circuit 1c.

The alternating current voltage V2c according to a turn ratio between the primary winding 2a and the secondary winding 2c is produced based on a duty ratio predetermined by the PWM controlling circuit 1c at the secondary winding 2b of the transformer 2. The alternating current voltage V2c is smoothed by the third diode 4b through the magnetic amplifier 4a so as to produce a pulsating voltage V4b. The electromagnetic energy of the pulsating voltage V4b is stored in the smoothing choke coil 4c. When the third diode 4b becomes in an OFF state and the fourth diode 4d becomes in an ON state, the electromagnetic energy is supplied to the smoothing capacitor 4e. The pulsating voltage V4b is smoothed by the smoothing capacitor 4e so as to produce a direct current output power voltage V4. And a direct current output power voltage V4 is output from the sub-output circuit section 4 to the load RL2. Stabilizing the direct current output power voltage v4 is performed by using a hysteres is characteristic of the magnetic amplifier 4a. That is to say, a change of the direct current output power voltage V4 is detected with resistors 4g and 4h, and the reset current, is for the magnetic amplifier 4a being necessary to stabilize the direct current output power voltage V4, is adjusted by the constant voltage controlling circuit 4f, and while a magnetic amplifier 4a is in an OFF state, the reset current flows to the magnetic amplifier 4a. A rise time of a during of the ON state of a magnetic amplifier 4a is controlled so as to stabilize the direct current output power voltage V4. In the sub-output circuit section 5, the same operation as the sub-output circuit section 4 is performed.

However, a conventional multi-outputting power supply circuit 100 has the following problem, that is to say, if the conventional multi-outputting power supply circuit 100 is not provided with the dummy resistor 3e, the load RL1 connected to the main-output circuit section 3 becomes, for example, light as in no-load, and when the load electric current becomes below a threshold electric current of the smoothing choke coil 3b, the energy stored in the smoothing choke coil 3b is stored in the smoothing capacitor 3d, therefore the direct current output power voltage V3 increases. The time width of an ON state of the magnetic switch 1d (NMOS), is controlled to become narrow for the purpose of suppressing a rise of the direct current output voltage V3. In this case, because a pulse width of the alternating current voltage V2c produced in the second winding 2c becomes narrow, the product of voltage and time (the product of VT) is not ensured. Therefore, the direct current output power voltage V4 may be not stable. On condition that V is a voltage between two terminals of the magnetic amplifier 4a, T is time to saturate the magnetic amplifier 4a. For the purpose of solving the problem, the necessary product of voltage and time is ensured by putting the dummy resistor 3e in the main-output circuit section 3 and preventing a narrowing of a time width in an On state of a main switch 1d (NMOS). Accordingly, there has been a problem that electric power is always consumed, and a efficiency of a power source goes down. And there is another problem that the number of parts increases because the dummy resistor 3e, a radiator( not shown) radiating heat of the dummy resistor 3e and the like, or a electric dummy circuit 3g (shown in FIG. 12) are required.

SUMMARY OF THE INVENTION

In view of the above, it is an object of the present invention to provide a multi-outputting power supply circuit capable of producing stably a direct current output voltage of a sub-output circuit section without a dummy resistor and an electric dummy circuit in a main-output circuit section.

According to a first aspect of the present invention, there is provided a multi-outputting switching power supply circuit including:

a main-output circuit section;

at least one sub-output circuit section; and wherein the at least one sub-output circuit section is controlled by a magnetic amplifier for amplifying electric power magnetically and the main-output circuit section has a synchronous rectifying circuit made up of a MOS transistor, whereby, a dummy load is omitted.

According to a second aspect of the present invention, there is provided a multi-outputting switching power supply circuit including:

a main-output circuit section having a smoothing choke coil;

at least one sub-output circuit section controlled by a magnetic amplifier for amplifying electric power magnetically; and wherein the main-output circuit section has a synchronous rectifying circuit made up of a MOS transistor, whereby, a dummy load is omitted.

According to a third aspect of the present invention, there is provided a multi-outputting switching power supply circuit including:

a direct current power supply section for producing a direct current input voltage;

a switching circuit for producing, by controlling the direct current input voltage for an ON or an OFF state based on an input control signal, a first alternating current voltage having a fixed frequency controlled by the control signal and a pulse width corresponding to the control signal;

a transformer for producing, by transforming the first alternating current voltage, a second alternating current voltage with a fixed voltage value and at least one third alternating current voltage;

a first rectifying circuit for producing, by rectifying the second alternating current voltage, a first pulsating voltage;

a first smoothing circuit for producing, by smoothing the first pulsating voltage, a first direct output voltage so as to supply the first direct current output voltage to a load;

a voltage change detecting circuit for producing, by detecting a change of the first direct current output voltage, a detective signal;

a controlling circuit for producing the control signal to control a pulse width of the first alternating current voltage for negative feed-back according to a level of the detective signal;

at least one magnetic amplifier for producing a fourth alternating current voltage for producing, by controlling the third alternating current voltage for an ON or an OFF state based on the reset electric current, a fourth alternating current voltage with a pulse width corresponding to a reset electric current;

at least one second rectifying circuit for producing, by rectifying the fourth alternating current voltage, a second pulsating voltage;

at least one second smoothing circuit for producing, by smoothing the pulsating voltage, a second direct current output voltage so as to supply the second direct current output voltage to a load;

at least one voltage controlling circuit for producing, by detecting a change of the second direct current output voltage, the reset electric current to control the fourth alternating current voltage for negative feed-back; and wherein the first rectifying circuit includes a switching circuit for producing the first pulsating voltage by controlling the second alternating current voltage for an ON or an OFF state, synchronizing with a timing of switching in the switching circuit.

In the foregoing, a preferable mode is one wherein the switching circuit is provided with a MOS transistor for producing, by controlling the second alternating current voltage for the ON or the OFF state, synchronizing with a change of polarity of the second alternating current voltage, the first pulsating voltage.

According to a fourth aspect of the present invention, there is provided a multi-outputting switching power supply circuit including:

a direct current power supply section for producing a direct current input voltage;

a switching circuit for producing, by controlling the direct current input voltage for an ON or OFF state based on the input control signal, a first alternating current voltage having a fixed frequency controlled by a control signal and a pulse width corresponding to a control signal;

a transformer for producing, by transforming the first alternating current voltage, a second alternating current voltage with a fixed voltage value and at least one third alternating current voltage;

a first rectifying circuit for producing, by rectifying the second alternating current voltage, a first pulsating voltage;

a first smoothing circuit for producing, by smoothing the first pulsating voltage, a first direct current output voltage so as to supply the first direct current output voltage to a load;

a voltage change detecting circuit for producing, by detecting a change of the first direct current output voltage, a detecting signal;

a controlling circuit for producing the control signal to control a pulse width of the first alternating current voltage for negative feed-back based on a level of the detective signal;

at least one magnetic amplifier for producing, by controlling the third alternating current voltage for an ON or an OFF state based on the reset electric current, a fourth alternating current voltage with a pulse width corresponding to a reset electric current;

at least one rectifying circuit for producing, by rectifying the fourth alternating current, a second pulsating voltage;

at least one smoothing circuit for producing, by smoothing the second pulsating voltage, a second direct current output voltage so as to supply the second direct current voltage to a load;

at least one voltage controlling circuit for producing, by detecting a change of the second direct current output voltage, the reset electric current to control the fourth alternating current voltage for negative feed-back; and wherein the first rectifying circuit is provided with a first switching circuit for producing, by controlling the second alternating current voltage for an ON or OFF state, synchronizing with a timing of switching in the switching circuit, the first pulsating voltage, wherein the first smoothing circuit is provided with a smoothing capacitor for producing, by smoothing the first pulsating voltage, the first direct current output voltage, so as to supply the first direct current output voltage to a load, a choke coil for storing an electromagnetic energy caused by the pulsating voltage, a second switching circuit supplying the electromagnetic energy stored in the choke coil to the smoothing capacitor by becoming in an ON state when the first switching circuit is in an OFF state.

In the foregoing, a preferable mode is one wherein the first and second switching circuit are made up of a MOS transistor.

According to a fifth aspect of the present invention, there is provided a multi-outputting switching power supply circuit including:

a direct current power supply section for producing a direct current input voltage;

a switching circuit for producing, by controlling the direct current input voltage for an ON or OFF state based on the input control signal, a first alternating current voltage having a fixed frequency controlled by a control signal and a pulse width corresponding to the control signal;

a transformer for producing, by transforming the first alternating current voltage, a second alternating current voltage with a fixed voltage value and at least one third alternating current voltage;

an active clamp circuit for resetting a core of the transformer by flowing an excitation current through a primary winding of the transformer while the switching circuit is in the OFF state;

a first rectifying circuit for producing a first pulsating voltage by rectifying the second alternating current voltage;

a first smoothing circuit for producing, by smoothing the first pulsating voltage, a first direct current output voltage so as to supply the first direct current output voltage to a load;

a voltage change detecting circuit for producing, by detecting a change of the first direct current output voltage, a detective signal;

a controlling circuit for producing the control signal to control a pulse width of the first alternating current voltage for negative feed-back based on a level of the detective signal;

at least one magnetic amplifier for producing, by controlling the third alternating electric current for an ON or an OFF state based on the reset electric current, a fourth alternating current voltage with a pulse width corresponding to a reset electric current;

at least one second rectifying circuit for producing, by rectifying the fourth alternating current voltage, a second pulsating voltage;

at least one smoothing circuit for producing, by smoothing the second pulsating voltage, a second pulsating voltage so as to supply the second direct current output voltage to a load;

at least one voltage controlling circuit for producing, by detecting a change of the second direct current output voltage, the reset electric current to control the fourth alternating current voltage for negative feed-back; and wherein the first rectifying circuit is provided with a first switching circuit for producing, by controlling the second alternating current voltage for an ON or an OFF state, synchronizing with a timing of switching in the switching circuit, the first pulsating voltage and wherein the first smoothing circuit is provided with a smoothing capacitor for producing, by smoothing the first pulsating voltage, the first direct current output voltage, so as to supply the first direct current output voltage to a load, a choke coil for storing an electromagnetic energy caused by the first pulsating voltage and a second switching circuit supplying the electromagnetic energy stored in the choke coil to the smoothing capacitor by becoming in an ON state when the first switching circuit is in an OFF state.

In the foregoing, a preferable mode is one wherein the first and second switching circuit are made up of a MOS transistor.

According to a sixth aspect of the present invention, there is provided a multi-outputting switching power supply circuit including:

a direct current power supply section for producing a direct current input voltage;

a switching circuit for producing, by controlling the direct current input voltage for an ON or OFF state based on the input control signal, two or more first alternating current voltages, having a fixed frequency controlled by a control signal and a pulse width corresponding to the control signal;

a plurality of transformers for producing, by transforming the first alternating current voltage, a second alternating current voltage with a fixed voltage value and at least one third alternating current voltage;

a first rectifying circuit for producing, by rectifying the second alternating current voltage, a first pulsating voltage;

a first smoothing circuit for producing, by smoothing the first pulsating voltage, a first direct current output, so as to supply the first direct current output voltage to a load;

a voltage change detecting circuit for producing, by detecting a change of the first direct current output voltage, a detective signal;

a controlling circuit for producing the control signal to control a pulse width of the first alternating current voltage for negative feed-back based on a level of the detective signal;

at least one magnetic amplifier for producing a fourth alternating current voltage with a pulse width corresponding to a reset electric current by controlling the third alternating current voltage for an ON or an OFF state based on the reset electric current;

at least one second rectifying circuit for producing, by rectifying the fourth alternating current voltage, a second pulsating voltage;

at least one smoothing circuit for producing, by rectifying the second pulsating voltage, a second direct current output voltage so as to supply the second direct current output voltage to a load;

at least one voltage controlling circuit for producing, by detecting a change of the second direct current output voltage, the reset electric current to control the second alternating current voltage for negative feed-back; and wherein the first rectifying circuit includes a switching circuit for producing the first pulsating voltage by controlling the second alternating current voltage for an ON or an OFF state, synchronizing with a timing of switching in the switching circuit.

In the foregoing, a preferable mode is one wherein the switching circuit is made up of a MOS transistor for producing the first pulsating voltage by controlling the second alternating current voltage for an ON or an OFF state, synchronizing with a change of polarity of the second alternating current voltage.

Also, a preferable mode is one wherein the transformer includes an auxiliary winding for producing controlling voltage to control the switching circuit for an ON or an OFF state.

Also, a preferable mode is one wherein the transformer includes an auxiliary winding for producing controlling voltage to control the first and second switching circuit for an ON or an OFF state.

Furthermore, a preferable mode is one wherein the third alternating current voltage has a necessary pulse width to saturate the magnetic amplifier.

With above configurations, because the main-output circuit section is provided with the synchronous rectifying circuit made of the MOS transistor, even if the load becomes light, an abrupt narrowing of time width of an ON state of the MOS transistor does not occur. Therefore, the product of voltage and time (VT) is easily ensured, consequently, direct current output voltage is produced stably. Moreover, because the main-output circuit section does not need a dummy resistor and an electric dummy circuit, an efficiency of a power supply is improved and a number of parts can be decreased. Moreover, because an active clamp circuit is included in the input circuit section so as to obtain a ideal waveform of gate voltage of the MOS transistor, high efficiency is carried out. In addition, because each main-output circuit section and sub-output circuit section is provided with the input circuit section and the transistor, heat can be dispersed, and a multi-outputting power supply circuit can be small and thin. Moreover the number of the sub-output circuit section can be easily increased and decreased on demand.

BRIEF DESCRIPTION OF THE DRAWINGS

The above and other objects, advantages, and features of the present invention will be more apparent from the following description taken in conjunction with the accompanying drawings in which.

DETAILED DESCRIPTION OF THE PREFERRED EMBODIMENTS

Best modes of carrying out the present invention will be described in further detail using various embodiments with reference to the accompanying drawings.

First Embodiment

Figure 1A:
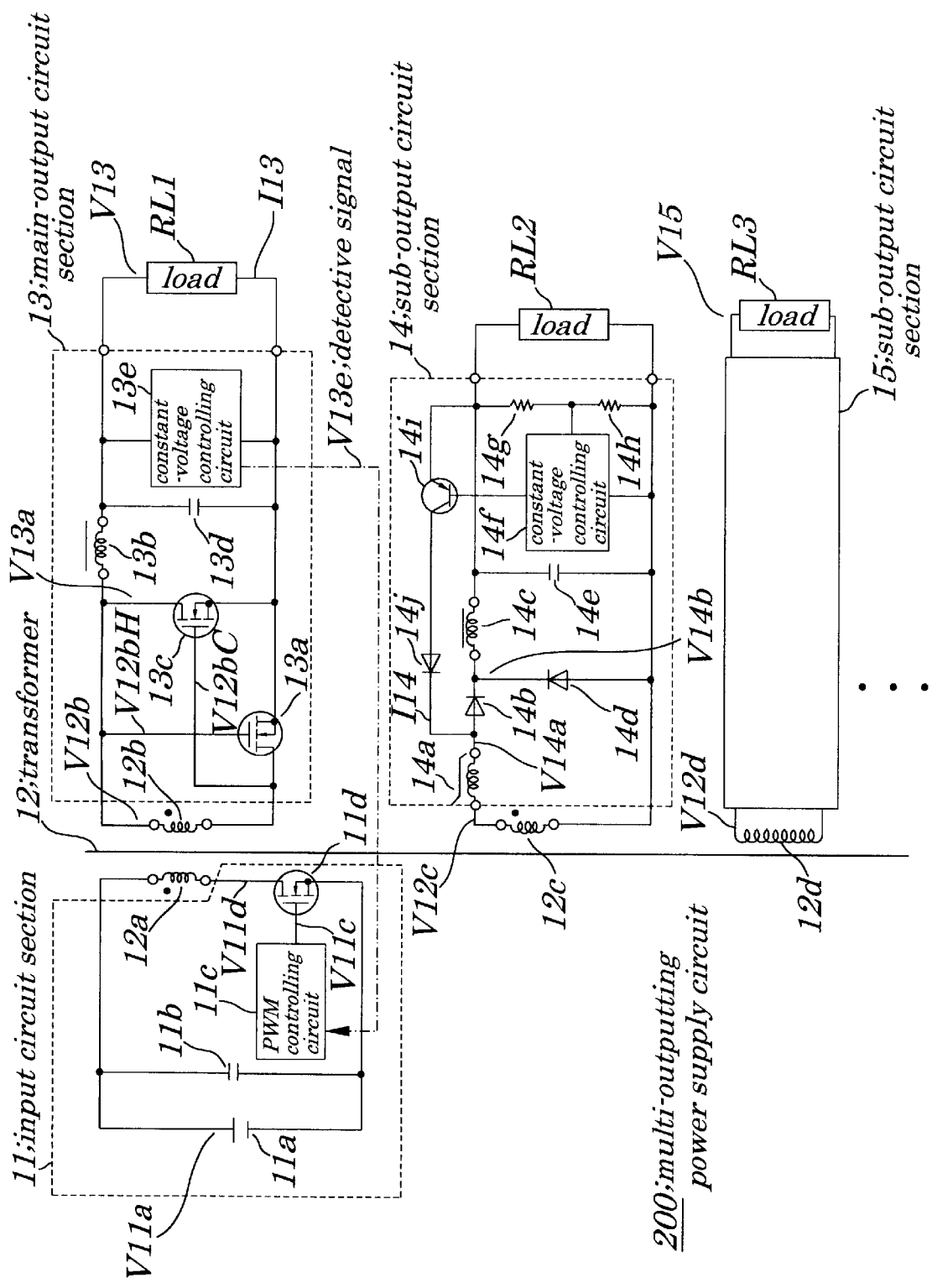
FIG. 1A is a circuit diagram for showing an electric structure of a multi-outputting power supply circuit according to a first embodiment of the present invention.

FIG. 1A is a circuit diagram for showing an electric structure of a multi-outputting power supply circuit 200 according to a first embodiment of the present invention. Also, FIG. 1B is an enlarged view of FIG. 1A.

Figure 1B:
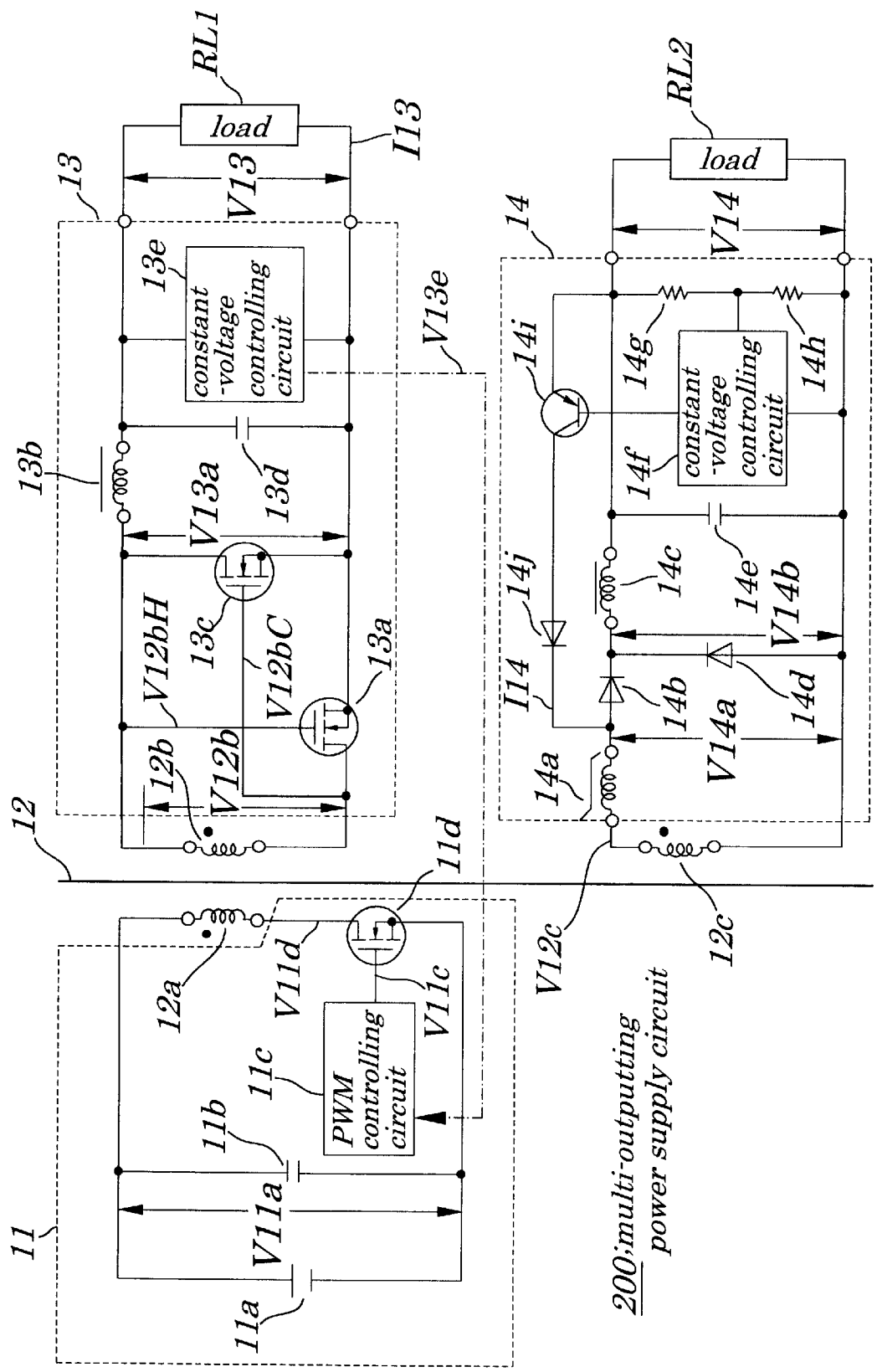
FIG. 1B is an enlarged diagram for showing the electric structure of the multi-outputting power supply circuit.

The multi-outputting power supply circuit 200 includes, as shown in FIGS. 1A and 1B, an input circuit section 11, a transformer 12, a main-output circuit section 13, and sub-output circuit sections 14 and 15. The input circuit section 11 includes a direct current power source section 11a, an input smoothing capacitor 11b, a PWM (Pulse Width Modulation) controlling circuit 11c as a controlling circuit 11c, and an NMOS 11d as a first switching circuit. The direct current power source section 11a is composed of a battery (not shown) and a like so as to produce a direct current input voltage V11a. The input smoothing capacitor 11b smoothes the direct current input voltage 11a. The PWM controlling circuit 11c produces a control signal V11c with a pulse width according to a fixed frequency and a detective signal V13e so as to control a pulse width of a first alternating current voltage V11d mentioned later for a negative feed-back. The NMOS 11d produces the first alternating current voltage V11d with a pulse width according to a fixed frequency and detective signal V13e by controlling direct current input voltage V11a for an On or an OFF state according to the control signal V11c. Here, the first alternating current voltage V11d is the voltage between a source and a drain of the NMOS 11d.

The transformer 12 has a primary winding 12a and secondary windings 12b, 12c, and 12d, and produces a second alternating current voltage V12b with a fixed voltage value and a plurality of third alternating current voltages V12c and V12d by transforming the first alternating current voltage V11d. Here, the second alternating current voltage V12b is the voltage between two terminals of the secondary windings 12b. The third alternating current voltage V12c is the voltage between two terminals of the secondary winding 12c. The third alternating current voltage V12d is the voltage between two terminals of the secondary winding 12d.

The main-output circuit section 13 includes a NMOS 13a composing a second switching circuit for working as a synchronous rectifying circuit, a smoothing choke coil 13b composing the first smoothing circuit, an NMOS 13c as a third switching circuit, a smoothing capacitor 13d and a constant-voltage controlling circuit 13e as a voltage change detecting circuit. The main-output circuit section 13 is connected to a load RL1. The NMOS 13a produces a first pulsating voltage V13a by controlling the second alternating current voltage V12b for an ON or an OFF state, synchronizing with a change of polarity of the second alternating current voltage V12b. The smoothing choke coil 13b stores electromagnetic energy caused by the first pulsating voltage V13a. When the NMOS 13a is an OFF state, the NMOS 13c becomes in an ON state so as to supply electromagnetic energy stored in the smoothing choke coil 13b for the smoothing capacitor 13d. The smoothing capacitor 13d produces a first direct current output voltage V13 by smoothing the first pulsating voltage V13a, and supplies the first direct current output voltage V13 to the load RL1. Here, the first pulsating voltage V13a is the voltage between a source and a drain of the NMOS 13c. The first direct current output voltage V13 is the voltage between two terminals of the load. The constant-voltage controlling circuit 13e produces the detective signal V13e by detecting a change of the first direct current output voltage V13.

The sub-output circuit section 14 includes a magnetic amplifier 14a, a third diode 14b, a smoothing choke coil 14c, a fourth diode 14d, a smoothing capacitor 14e, a constant-voltage controlling circuit 14f, resistors 14g and 14h, a transistor 14i and a diode 14j. The sub-output circuit section 14 is connected to a load RL2. The magnetic amplifier 14a produces a fourth alternating current voltage V14a with a pulse width corresponding to a reset current I14 by controlling the third alternating current voltage V12c for an ON or an OFF state based on the reset current I14. The fourth alternating current voltage V14a is the voltage between an output terminal of the magnetic amplifier 14a and a cold side terminal of the second winding 12c. The third diode 14b composing the second rectifying circuit 101 produces a second pulsating voltage V14b by rectifying the fourth alternating current voltage V14a. The second pulsating voltage V14b is the voltage between a anode and cathode of the fourth diode 14d. The second smoothing circuit is composed of the smoothing choke coil 14c, the fourth diode 14d, and the smoothing capacitor 14e. The second smoothing circuit 101 produces a second direct current output voltage V14 by smoothing the second pulsating voltage V14b so as to supply the second direct current output voltage 14 for the load RL2. The second direct current output voltage 14 is the voltage between two terminals of the load RL2. A voltage controlling circuit is composed of the constant-voltage controlling circuit 14f, resistors 14g and 14h, the transistor 14i,and the diode 14j. The voltage controlling circuit 102 produces the reset current I14 to control the fourth alternating current voltage V14a for negative feed-back by detecting a change of the second direct current output voltage V14. The sub-output circuit section 15 is approximately the same structure as the sub-output circuit section 14, and is connected to a load RL3.

Figure 2:
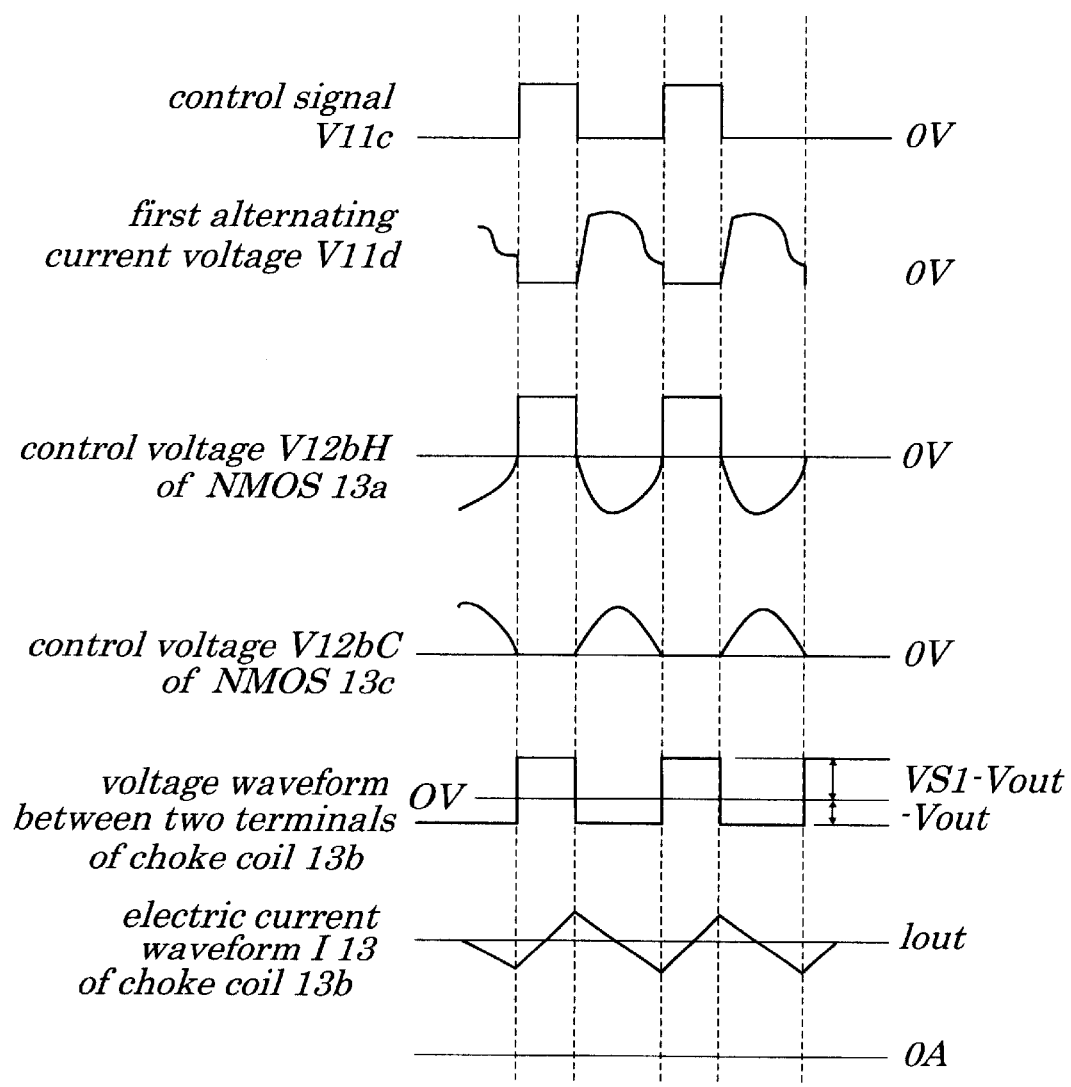
FIG. 2 is a waveform chart being measured in each part of the multi-outputting power supply circuit according to the first embodiment of the present invention.

FIG. 2 is a waveform chart being measured in each section of a multi-outputting power supply circuit 200 according to the first embodiment; the vertical axis shows voltage and the horizontal axis shows time.

The following will describe an operation of the multi-outputting power supply circuit 200 of the first embodiment with reference to FIGS. 1 and 2.

Direct current input voltage V11a is produced by the direct current power source section 11a and is output. The direct current input voltage V11a is smoothed by the input smoothing capacitor 11b. A control signal V11c with a pulse width corresponding to a fixed frequency and the detective signal V13e is produced by the PWM controlling circuit 11c. The direct current input voltage V11a is controlled for an ON or an OFF state by the NMOS 11d based on the control signal V11c so as to produce the first alternating current voltage V11d with a pulse width corresponding to a fixed frequency and the detective signal V13e. The first alternating current voltage V11d is transformed by the transformer 12 so as to output the second alternating current voltage V12b and the third alternating current voltage V12c and V12d from the transformer 12.

The second alternating current voltage V12b is controlled for an ON or an OFF state by the NMOS 13a so as to produce the first pulsating voltage V13a, synchronizing with a change of polarity of the second alternating current voltage V12b (that is to say, a change of a control voltage of the NMOS 13a). The electromagnetic energy of the first pulsating voltage V13a is stored in the smoothing choke coil 13b. The electromagnetic energy is controlled for an ON or an OFF state by the NMOS 13c, synchronizing with a change of polarity of the second alternating current voltage V12b (that is to say, a change of control voltage V12bC of the NMOS 13c), and is provided to the smoothing capacitor 13d, when the NMOS 13a is in the OFF state and the NMOS 13c is in the ON state. The first pulsating voltage V13a is smoothed by the smoothing capacitor 13d so as to produce the first direct current output voltage V13. The first direct current output voltage V13 is supplied to the load RL1. When the first direct current output voltage V13 changes, the constant voltage controlling circuit 13e outputs the detective signal V13e by detecting a change of the first direct current output voltage V13. The detective signal V13e is provided to the PWM controlling circuit 11c so that the PWM controlling circuit 11c controls a pulse width of the first alternating current voltage V11d for negative feed-back.

When load electric current flowing through the smoothing choke coil 13b is below a threshold electric current of the smoothing choke coil 13b, in the state that the NMOS 13a is in an ON state as shown in FIG. 2, the load current flows in the opposite direction because electric current flows in both directions. Therefore, when the load is light, excessive energy is returned to the input circuit section 11 through transformer 12 after flowing through the smoothing choke coil 13b in the opposite direction. Therefore, the load current flows through the smoothing choke coil 13b constantly, and as shown in FIG. 2, the voltage between two terminals of the smoothing choke coil 13b changes between (VS1−Vout) and (−Vout). On condition that VS1 is voltage between two terminals of the smoothing choke coil 13b when a load is light, Vout is a voltage drop against VS1 when a load electric current I13 flows in the opposite direction. Accordingly, even when a load is light, the direct current output voltage V13 does not increase, an abrupt narrowing of time width does not occur when the NMOS 11d is in an ON state.

The third alternating current voltage V12c is controlled for an ON or an OFF state based on the reset current I14 so as to produce the fourth alternating current voltage V14a with a pulse width corresponding to the reset current I14. In this case, because abrupt narrowing of time width does not occur, the third alternating current voltage V12c has a necessary pulse width to saturate the magnetic amplifier 14a, and the product of voltage and time is ensured in the magnetic amplifier 14a. On a condition that V is voltage between two terminals of the magnetic amplifier 14a, T is time to saturate the magnetic amplifier 14a. The fourth alternating current voltage V14a is rectified by the third diode 14b so as to produce the second pulsating voltage V14b.

The electromagnetic energy of the second pulsating voltage V14b is stored in the smoothing choke coil 14c. Because the fourth diode 14d becomes in an ON state when the third diode 14b is an OFF state, the electromagnetic energy is provided to the smoothing capacitor 14e. The second pulsating voltage V14b is smoothed by the smoothing capacitor 14e so as to produce the second direct current output voltage V14. The second direct current output voltage V14 is supplied to the load RL2. The second direct current output voltage V14 is divided with resistors 14g and 14h, and the change of divided voltage is detected by the constant-voltage controlling circuit 14f. The electric current flowing through transistor 14i is controlled by the constant-voltage controlling circuit 14f, and the reset current I14 is provided to the magnetic amplifier 14a through the diode 14j from the collector of the transistor 14i so as to control the fourth alternating current voltage V14a for negative feed-back; the second direct current output voltage V14 becomes stable. In the sub-output circuit section 15, the same operation as that of the sub-output circuit section 14 is executed.

As mentioned above, in the first embodiment, because the main-output circuit section 13 includes a synchronous rectifying circuit composed of the NMOS 13a, even when the load RL1 becomes light, in a state that the NMOS is in the ON state, abrupt narrowing of time width does not occur. Therefore, the product of voltage and time is easily ensured in the magnetic amplifier 14a, and the second direct current output voltage V14 and V15 are stably produced in the sub-output circuit sections 14 and 15. Moreover, because the main-output circuit section 13 does not need a dummy resistor and an electric dummy circuit, an efficiency of the power source is improved and the number of parts decrease more than ever.

The Second Embodiment

Figure 3:
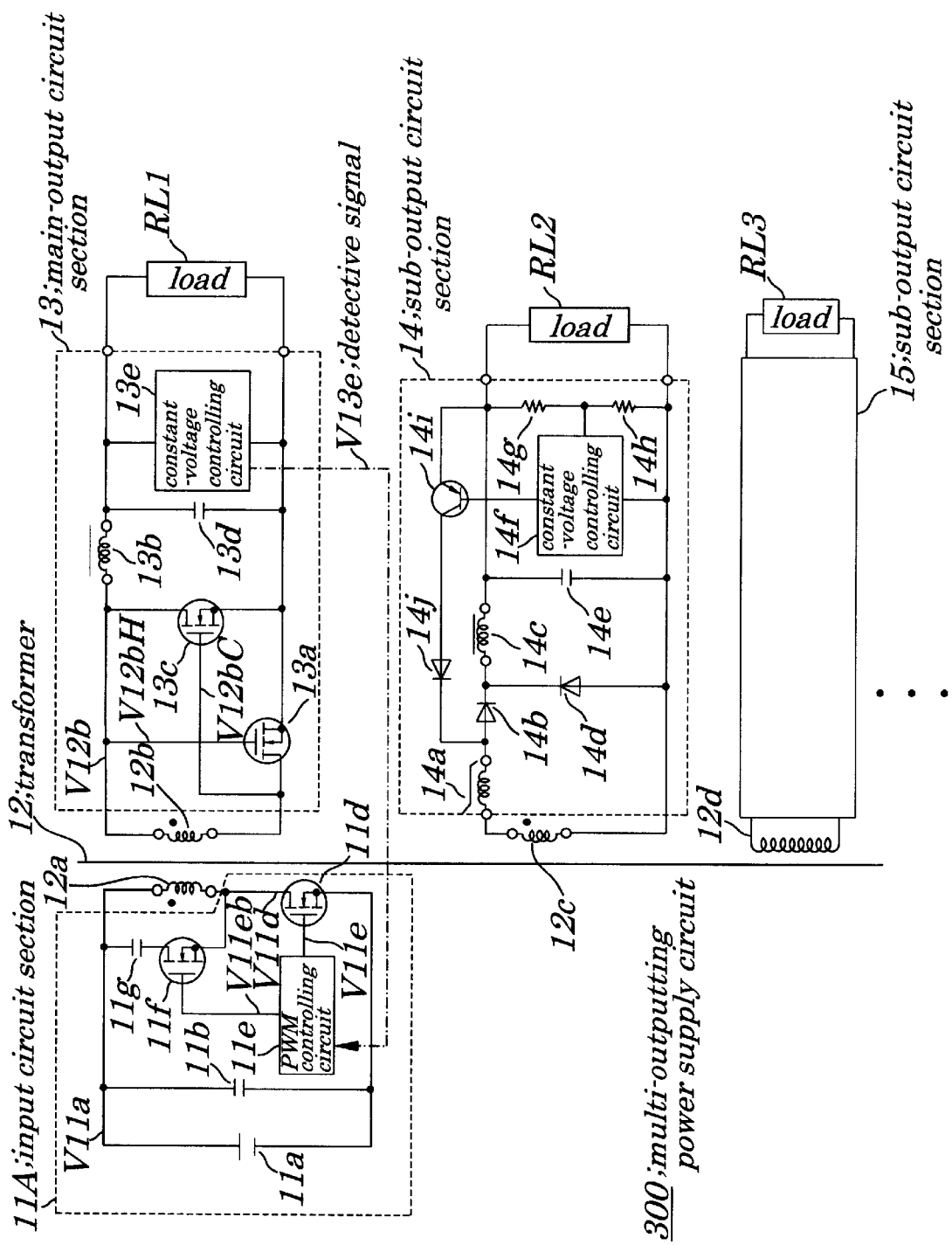
FIG. 3 is a circuit diagram for showing an electric structure of a multi-outputting power supply circuit according to a second embodiment of the present invention.

FIG. 3 is a circuit diagram for showing a electrical structure of a multi-outputting power supply circuit 300 according to a second embodiment of the present invention. Same components as in FIG. 1 are indicated respectively by a same numeral.

The multi-outputting power supply circuit 300 is provided with an input circuit section 11A instead of the input circuit section 11 shown in FIG. 1. The input circuit section 11A is provided with a PWM controlling circuit 11e instead of the PWM controlling circuit 11c as shown in FIG. 1, moreover is provided with an active clamp circuit composed of an NMOS 11f and a capacitor 11g. The PWM controlling circuit 11e produces the same control signal V11e as the control signal V11c of the PWM controlling circuit 11c and a control signal V11eB which is opposite in phase to the control signal V11e. The NMOS 11f is in an ON state while an NMOS 11d is in an OFF state, and exciting current is flowed through the primary winding 12a by making a resonance circuit of the primary winding 12a of a transformer 12 and the capacitor 11g so as to reset a core of the transformer 12. The other structures are the same as that of FIG. 1.

Figure 4:
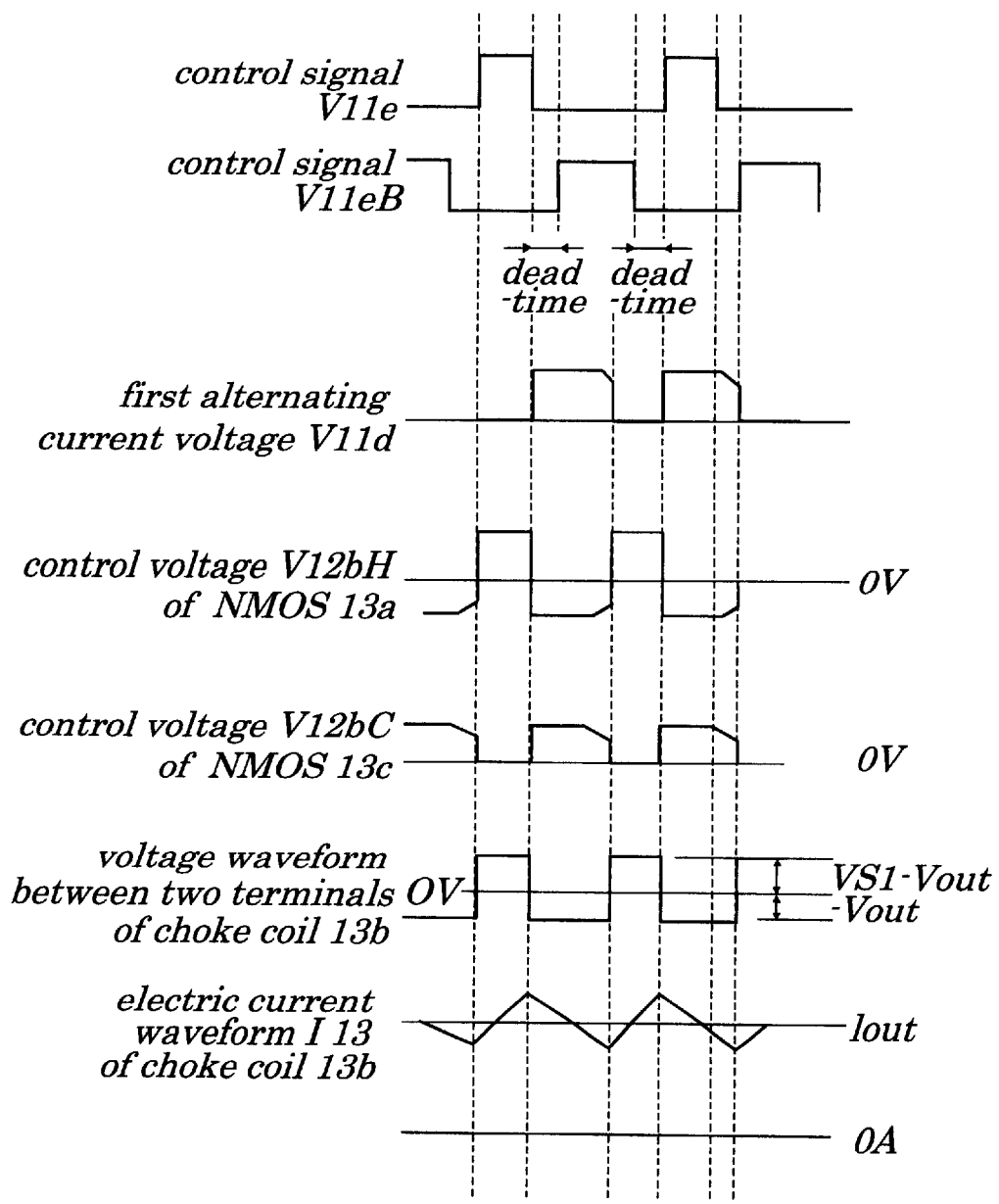
FIG. 4 is a waveform chart being measured in each part of the multi-outputting power supply circuit according to the second embodiment of the present invention.

FIG. 4 is a waveform chart being measured in each portion of the multi-outputting power supply circuit 300 according to the second embodiment.

The operation of the multi-outputting power supply circuit 300 is different from the first embodiment in following points.

That is to say, as shown in FIG. 4, the NMOS 11d and the NMOS 11f become in an ON or OFF state mutually, and timing of the control signal V11e and V11e b output from the PWM controlling circuit 11e has a dead-time so as to prevent from a simultaneous ON state of the NMOS 11d and the NMOS 11f. While the NMOS 11f is in the ON state. A resonance circuit is composed of the primary winding 12a of the transformer 12 and the capacitor 11g. When excitation current flows through the primary winding 12a, a core of the transformer 12 is reset. Therefore, as shown in FIG. 4, a waveform of a first alternating current voltage V11d is close to a square wave, and a waveform of a second alternating current voltage V12d is close to the first alternating current voltage V11d. Accordingly, gate voltage of the NMOS 13c becomes an ideal square waveform; current loss of the NMOS 13c is improved to attain a high efficiency.

As mentioned above, in the second embodiment, because the input circuit section 11A is provided with an active clamp circuit, and gate voltage becomes an ideal square waveform, accordingly, high efficiency is attained in addition to the advantages of the first embodiment.

The Third Embodiment

Figure 5:
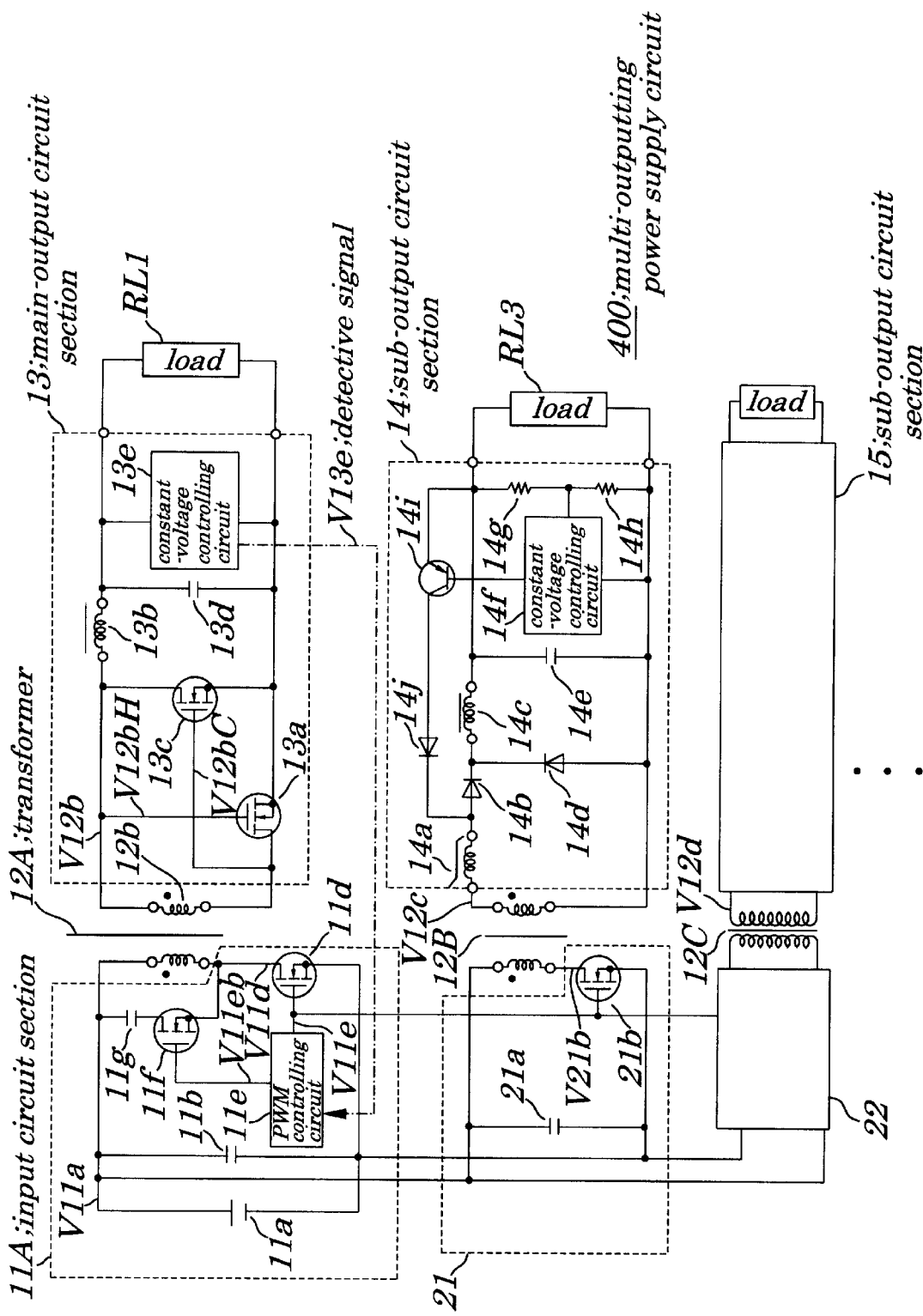
FIG. 5 is a circuit diagram for showing an electric structure of a multi-outputting power supply circuit according to a third embodiment of the present invention.

FIG. 5 is circuit diagram for showing an electrical structure of a multi-outputting power supply circuit 400 according to a third embodiment of the present invention. Same components as in FIG. 1 are indicated respectively by a same numeral.

In the multi-outputting power supply circuit 400, a main-output circuit section 13 and sub-output circuit sections 14 and 15 are respectively provided with transformers 12A, 12B, and 12C instead of transformer 12 shown in FIG. 3. The total amount of power capacity is nearly the same power capacity as that of transformer 12 shown in FIG. 1. And transformer 12B and 12C are respectively provided with input circuit sections 21 and 22. The input circuit section 21 is provided with a smoothing capacitor 21a, and a NMOS 21b as a switching circuit 104. The input circuit section 22 is approximately the same structure as a input circuit section 21. The other features are the same structure as those of FIG. 1.

Figure 6:
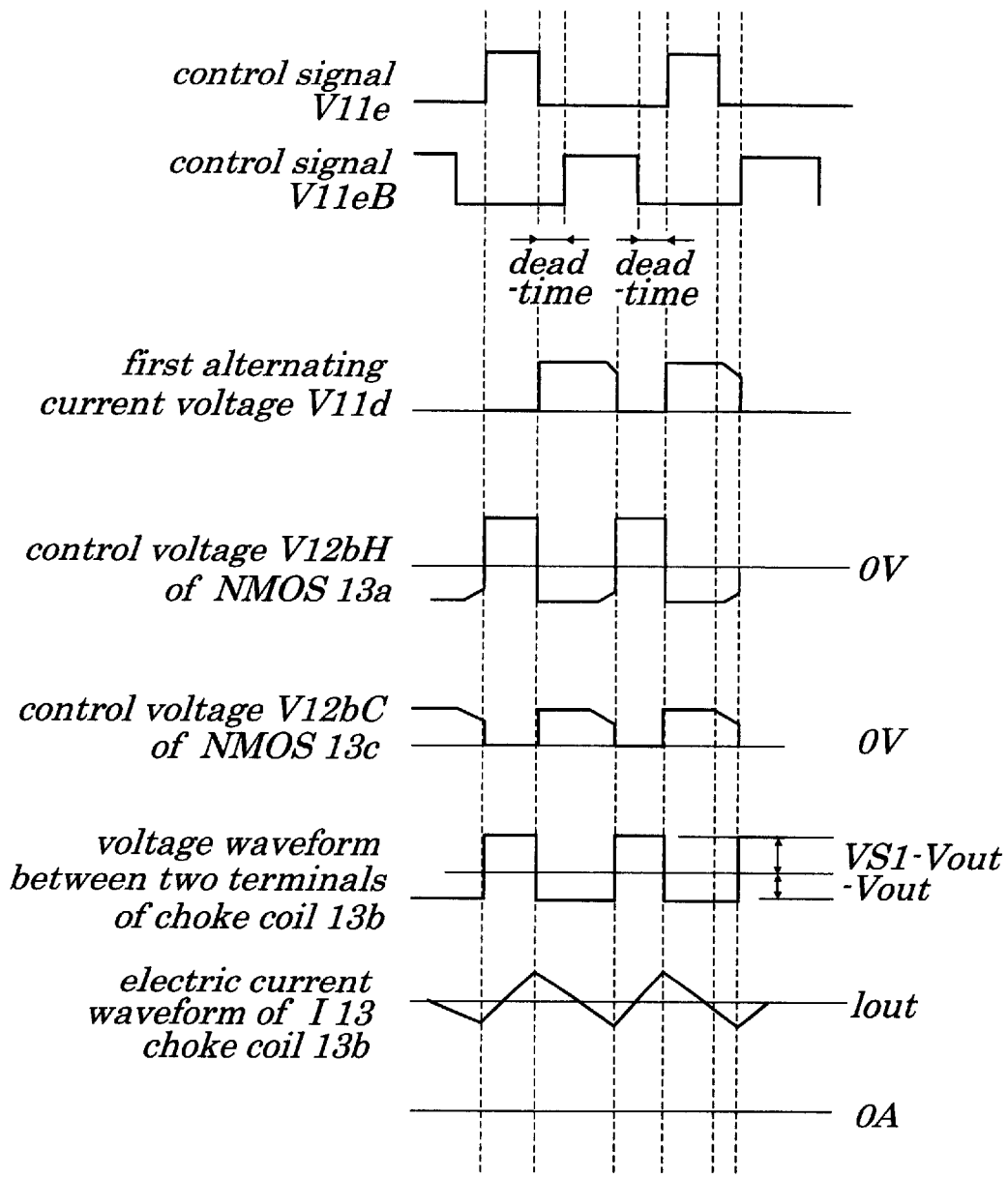
FIG. 6 is a waveform chart being measured in each part of the multi-outputting power supply circuit according to the third embodiment of the present invention.

FIG. 6 is a waveform chart being measured in each portion of the multi-outputting power supply circuit 400 according to the embodiment.

Operation of the multi-outputting power supply circuit 400 is different from that of the second embodiment in the following points.

That is to say, direct current input voltage V11a is smoothed by smoothing capacitor 21a. Direct current input voltage V11a is controlled for an ON or an OFF state based on a control signal V11e by the NMOS 21b so as to produce a first alternating current voltage V21b with a pulse width corresponding to a fixed frequency and a detective signal V13e. Here, The first alternating current voltage V21b is the voltage between a source and drain of the NMOS 21b. The first alternating current voltage V21b is transformed by the transformer 12B so as to produce a third alternating current voltage V12b from the transformer 12B. Similarly, the third alternating current voltage V12d is output from the transformer 12C. Subsequently, as shown in FIG. 6, the same operation as that of the second embodiment is executed. Because the embodiment is provided with the input circuit sections 11A, 21, and 22 and the transformers 12A, 12B, and 12C, in which the input circuit sections 11A, 21, and 22 and as the transformers 12A, 12B, and 12C are dispersed, heat is dispersed.

As mentioned above, in the third embodiment, because the main-output circuit section 13 and the sub-output circuit sections 14 and 15 are respectively provided with input circuit sections 11A, 21, and 22 and the transformers 12A, 12B, and 12C heat is dispersed and the multi-outputting power supply circuit 400 can become a small type and a thin type. Moreover, on demand, the number of sub-outputs is easily increased or decreased.

The Fourth Embodiment

Figure 7:
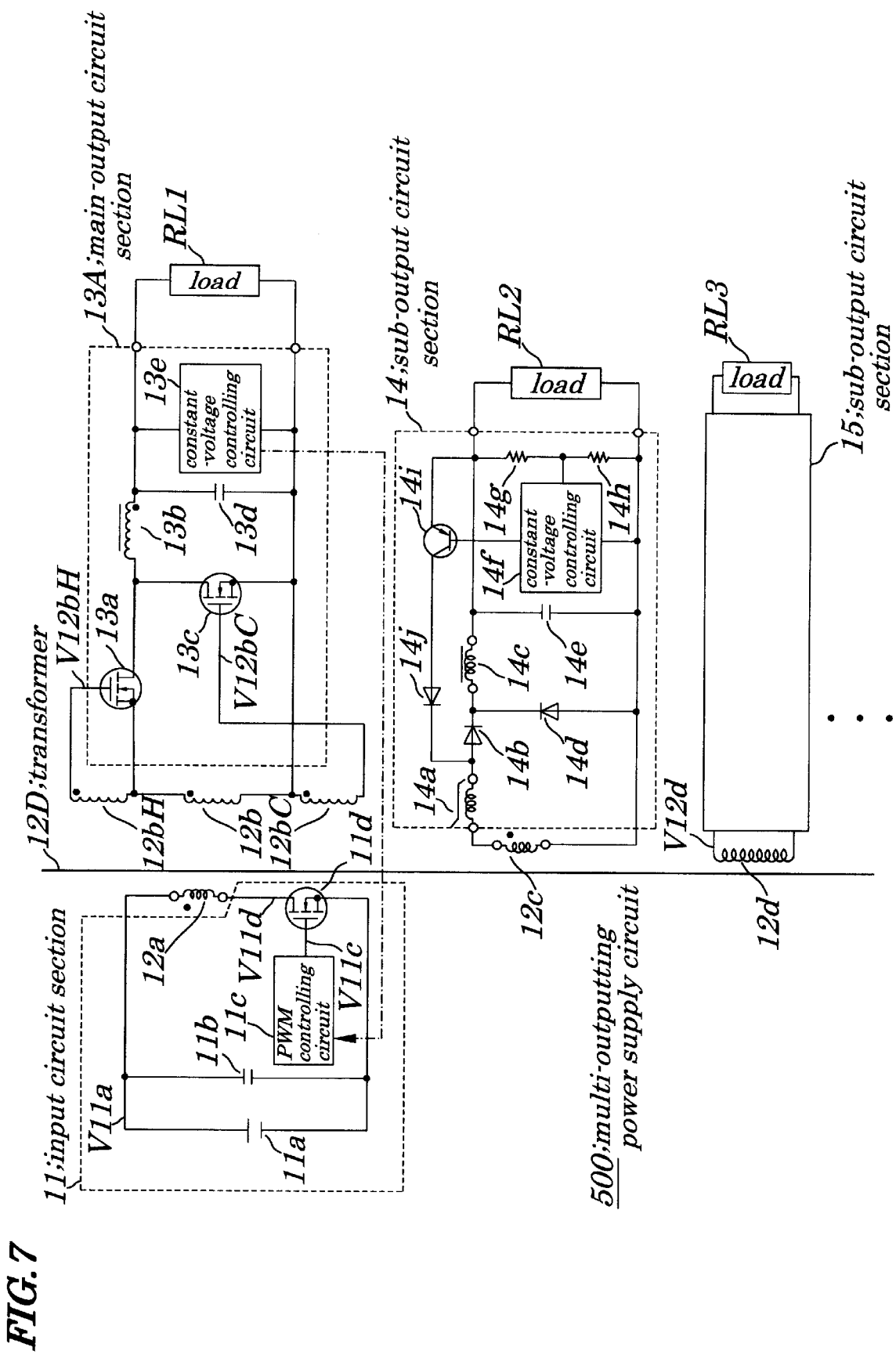
FIG. 7 is a circuit diagram for showing an electric structure of a multi-outputting power supply circuit according to a fourth embodiment of the present invention.

FIG. 7 is a circuit diagram for showing an electric structure of the multi-outputting power supply circuit 500 according to a fourth embodiment of the present invention. Same components as in FIG. 1 are indicated respectively by a same numeral.

The multi-outputting power supply circuit 500 is provided with a transformer 12d and a main-output circuit section 13A instead of a transformer 12 and a main-output circuit section 13 as shown in FIG. 1. The transformer 12d includes an auxiliary winding 12bH producing a control voltage V12bH to control an NMOS 13a for an ON or an OFF state, and a auxiliary winding 12bC producing a control voltage V12bC to control an NMOS 13c for an ON or an OFF state in addition to a secondary winding 12b. With regard to the main-output circuit section 13A, a source of the NMOS 13a is connected to a hot side, a drain of the NMOS 13a is connected a smoothing choke coil 13b. The other features of the multi-outputting power supply 500 are of approximately the same structure as those of FIG. 1.

Figure 8:
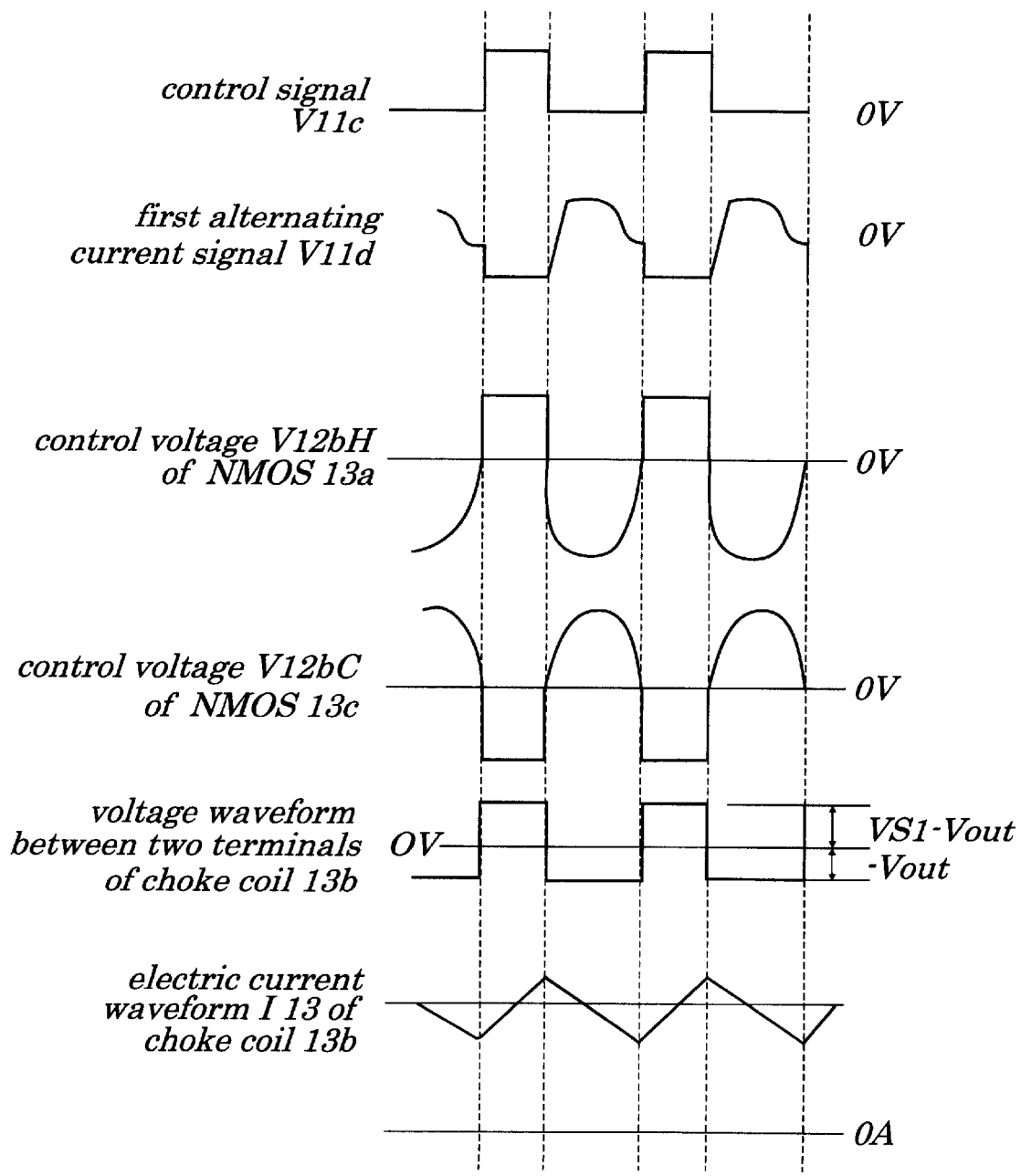
FIG. 8 is a waveform chart being measured in each part of a multi-outputting power supply circuit according to the fourth embodiment of the present invention.

FIG. 8 is a waveform chart being measure in the a multi-outputting power supply circuit 500 according to the embodiment.

With regard to an operation of the multi-outputting power supply circuit 500, as shown in FIG. 8, the NMOS 13a is controlled for an On or an OFF state by the control voltage V12bH caused by the auxiliary winding 12bH, and the NMOS 13c is controlled for an ON or an OFF state by the control signal V12bC generated at the auxiliary winding 12bC, therefore nearly the same operation as that of the first embodiment is executed.

As mentioned above, in the fourth embodiment, the NMOS 13a is controlled for the ON or the OFF state by the control voltage V12bH, and the NMOS 13c is controlled for the ON or the OFF state by the control voltage V12bC, consequently the fourth embodiment nearly has a the same advantage as the first embodiment.

The Fifth Embodiment

Figure 9:
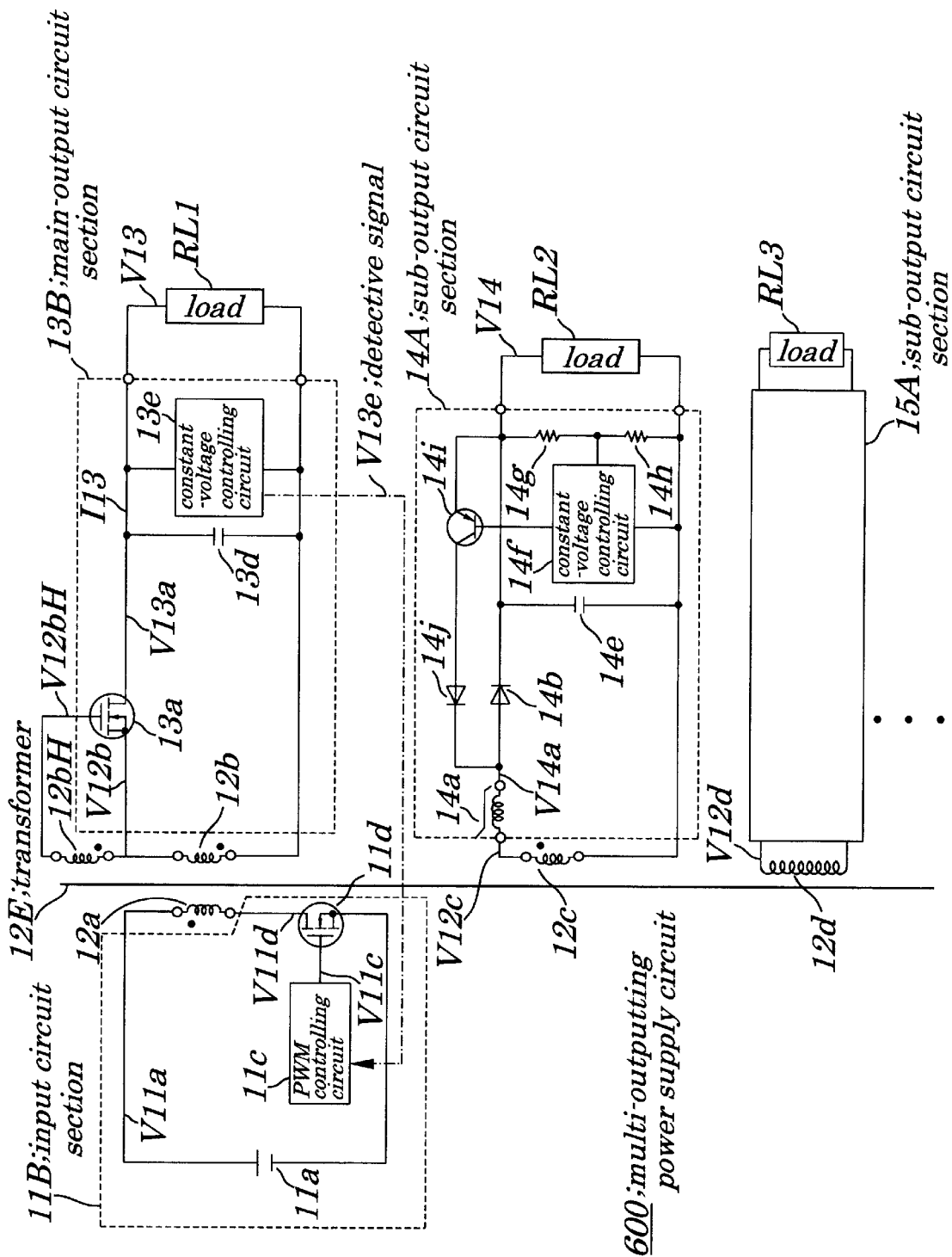
FIG. 9 is a circuit diagram for showing an electric structure of a multi-outputting power supply circuit according to a fifth embodiment of the present invention.

FIG. 9 is a circuit diagram for showing an electric structure of a multi-outputting power supply circuit 600 according to a fifth embodiment of the present invention. Same components as in FIG. 7 are indicated respectively by a same numeral.

The multi-outputting power supply circuit 600 is provided with an input circuit section 11B, a transformer 12E, a main output circuit section 13B, and sub-output circuit sections 14A and 15A instead of an input circuit section 11, a transformer 12d, a main-output circuit section 13A and sub-output circuit sections 14 and 15. The input circuit section 11B is composed by removing a smoothing capacitor 11b from the input circuit section 11. The transformer 12E is composed by removing an auxiliary winding 12bC from the transformer 12d. The main-output circuit section 13B is composed by removing a smoothing choke coil 13b and an NMOS 13c from the main-output circuit section 13A. The sub-output circuit section 14A is composed by removing a smoothing choke coil 14c and a fourth diode 14d from the sub-output circuit section 14. The sub-output circuit section 15A is approximately the same structure as the sub-output circuit section 14A.

Figure 10:
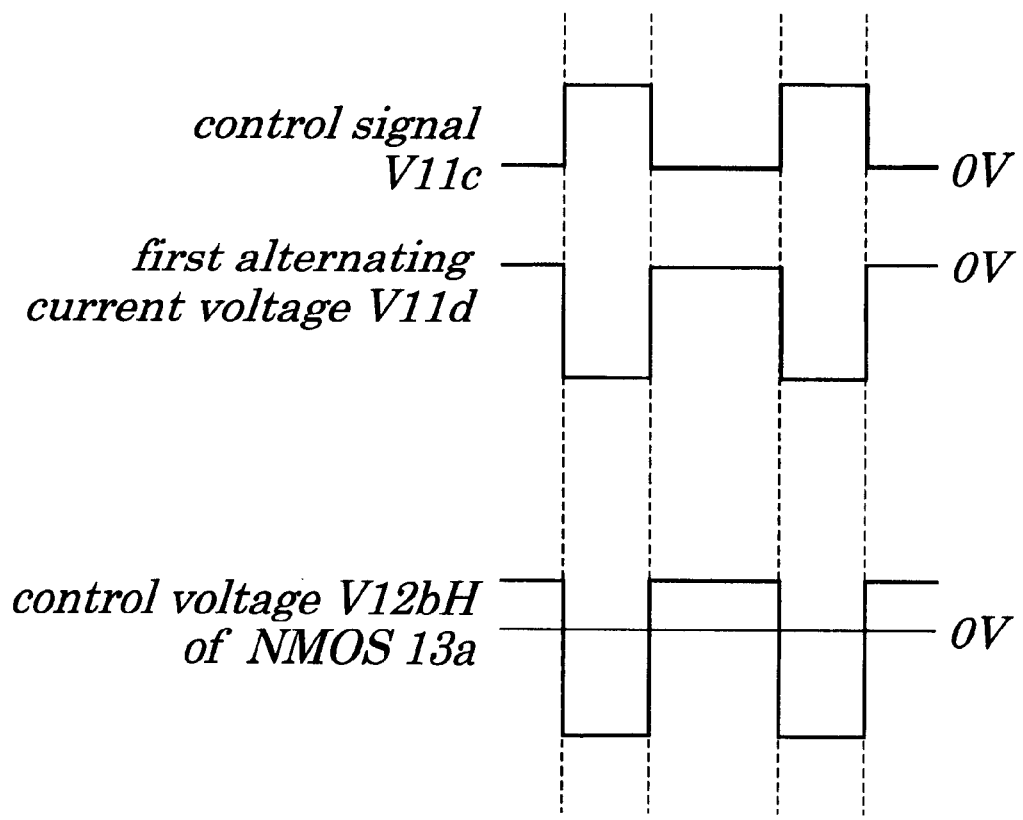
FIG. 10 is a waveform chart being measured in each part of the multi-outputting power supply circuit according to the fifth embodiment of the present invention.
Figure 11:
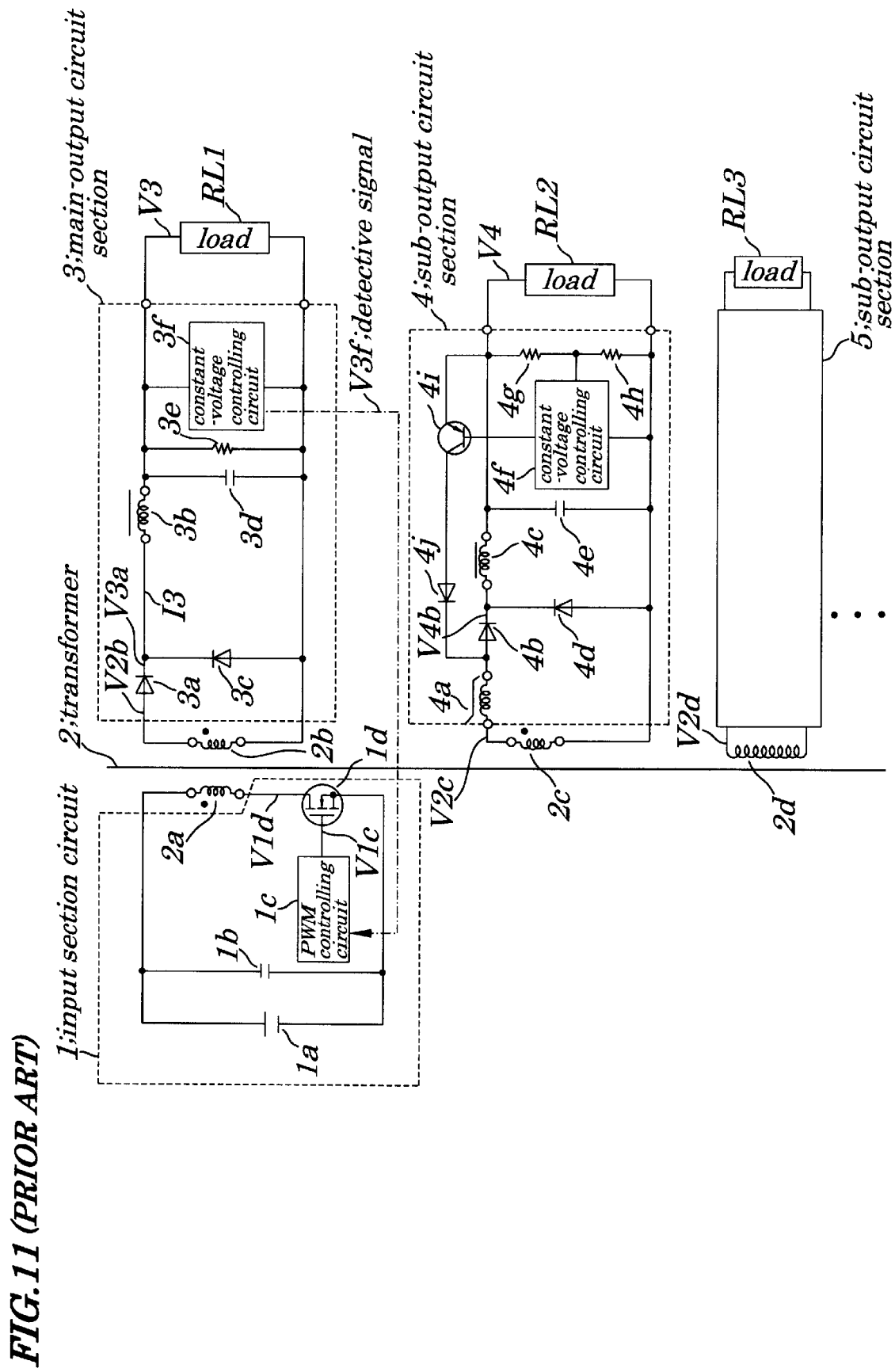
FIG. 11 is a circuit diagram for showing a conventional multi-outputting power supply circuit.
Figure 12:
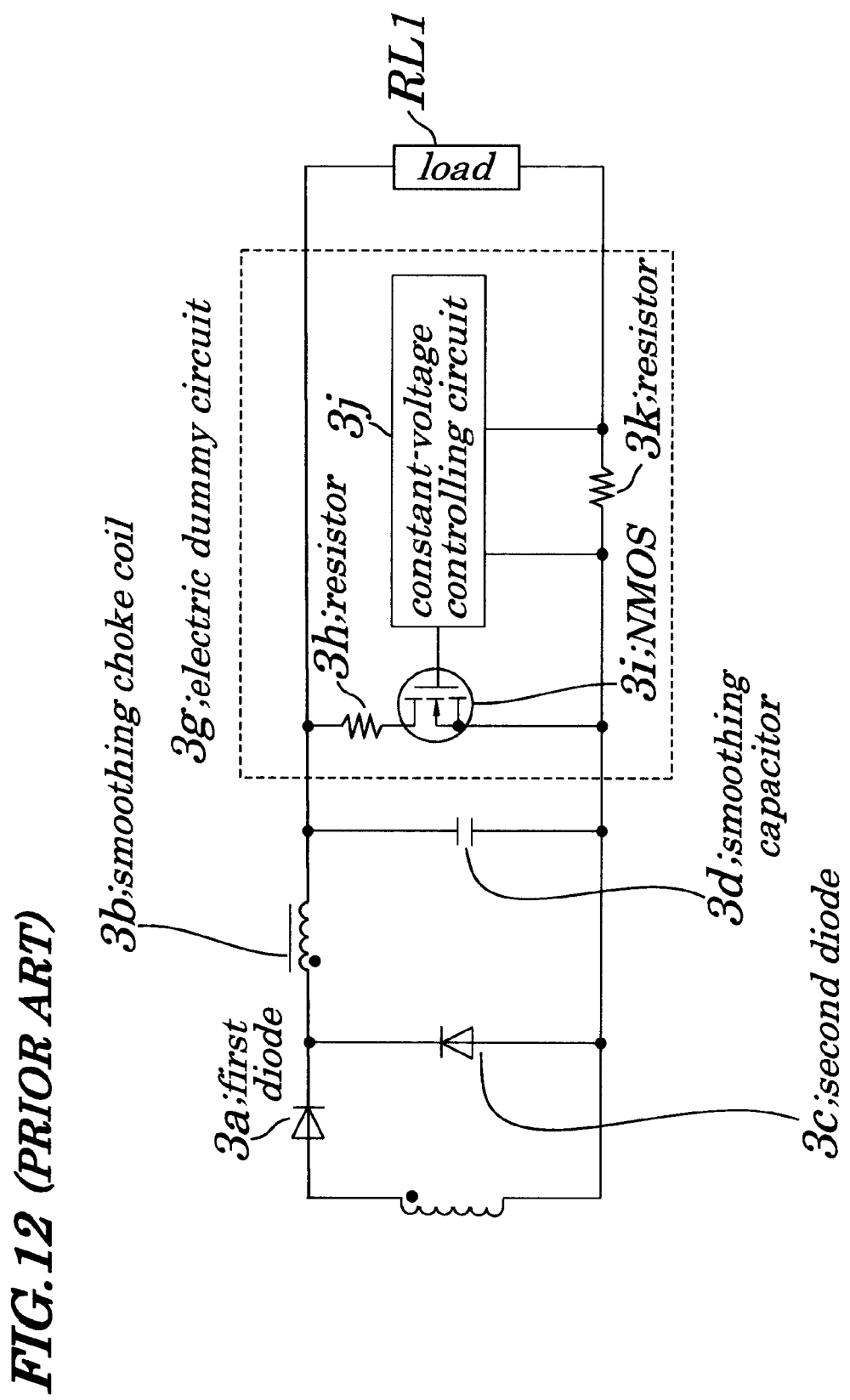
FIG. 12 is a circuit diagram for showing a conventional electric dummy circuit.
Figure 13:
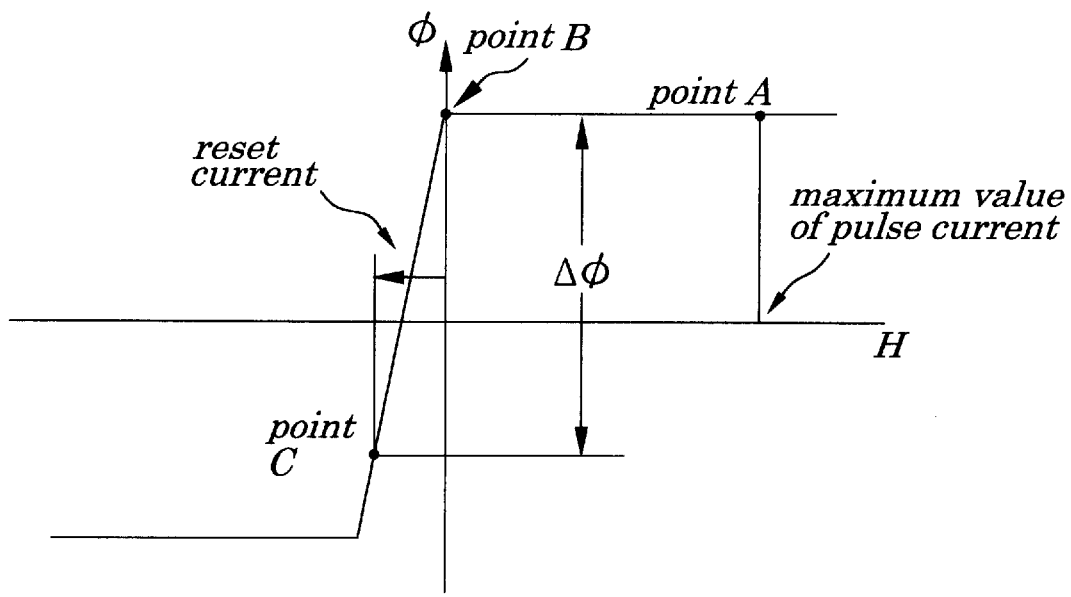
FIG. 13 is an illustration for explaining an operation principle of a magnetic amplifier as shown in FIG. 11.
Figure 14:
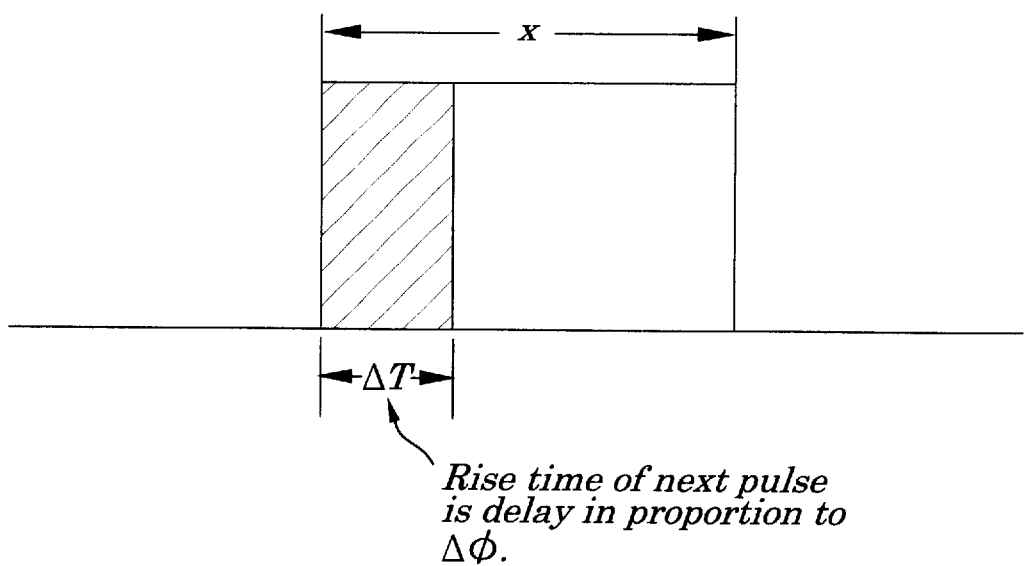
FIG. 14 is an illustration for showing the operation theory of the magnetic amplifier as shown in FIG. 11.

FIG. 10 is a waveform chart being measure in each section of the multi-outputting power supply circuit 600 according to the fifth embodiment. With regard to an operation of the multi-outputting power supply circuit 600, as shown in FIG. 10, direct current voltage is produced by a direct current power source section 11a and is output. A control signal V11c with a pulse width corresponding to a fixed frequency and a detective signal V13e is produced by a PWM controlling circuit 11c. Direct input voltage V11a is controlled for an ON or an OFF state based on the control signal V11c by an NMOS 11d so as to produce a first alternating current voltage V11d with a pulse width corresponding to a fixed frequency and the detective signal V13e. The first alternating current voltage V11d is transformed by the transformer 12E so as to output a control voltage V12bH, a second alternating current voltage V12b and a third alternating current voltage V12c, V12d from the transformer 12E.

The second alternating current voltage V12b is controlled for an ON or an OFF state, synchronizing with a change of polarity of the control voltage V12bH by an NMOS 13a, so as to produce a first pulsating voltage V13a. A smoothing capacitor 13d smoothes the first pulsating voltage V13a so as to produce a first direct current output voltage V13. The first direct current output voltage V13 is supplied to a load RL1. When the first direct current output voltage V13 changes, the detective signal V13e is produced by detecting the change of the first direct current output voltage V13 by a constant-voltage controlling circuit 13e. The detective signal V13e is supplied to the PWM controlling circuit 11c, and the pulse width of the first alternating current voltage V11d is controlled for negative feed-back by the PWM controlling circuit 11c. Even when the load RL1 becomes light and the load electric current I13 becomes small, in a state that the NMOS 13a is the ON state, because the electric current flows in both directions, the first direct current output voltage V 13 does not increase, and abrupt narrowing of the time width of an ON state of the NMOS 11d does not occur.

The third alternating current voltage V12c is controlled for an ON or an OFF state based on the reset current I14 so as to produce a fourth alternating current voltage V14a with a pulse width corresponding to the reset current I14. In this case, because an abrupt narrowing of the time width of the ON state of the NMOS 11d in the input circuit section 11B does not occur, the third alternating current voltage V12 has a necessary pulse width to saturate a magnetic amplifier 14a, and the product of voltage and time (the product of VT) is ensured for the magnetic amplifier 14a. On a condition that V is voltage between two terminals of the magnetic amplifier 14a, T is the time to ensure the magnetic amplifier 14a. The fourth alternating current voltage V14 is rectified by the third diode 14b so as to produce the second pulsating voltage V14b.

The smoothing capacitor 14e smoothes the second pulsating voltage V14b so as to produce the second direct current output voltageV14. The second direct current output voltage V14 is supplied to the load. The second direct current output voltage V14 is divided with resistors 14g and 14h, a change of divided resistor value is detected by the constant-voltage controlling circuit 14f. The electric current flowing through the transistor 14i is controlled by the constant-voltage controlling circuit 14f, the reset current I14 is supplied to the magnetic amplifier 14a through the diode 14j from a collector of the transistor 14j, therefore, the fourth alternating current voltage V14a is controlled for negative feed-back. Consequently, the second direct current output voltage V14 becomes stable. In the sub-output circuit section 15, the same operation as that of the sub-output circuit section 14 is performed.

As mentioned above, in the fifth embodiment, approximately the same operation as that of the fourth embodiment is performed, and there is the same advantage as that of the first embodiment.

It is apparent that the present invention is not limited to the above embodiment but may be changed and modified without departing from the scope and spirit of the present invention. The direct current power supply section may be any means for producing direct current input voltage, for example by rectifying and smoothing a commercial electric power supply. The second switching circuit may be any means for switching. The number of sub-output circuit sections 14 and 15 as shown in FIG. 1 may be any number. An input circuit section 11 according to the fourth embodiment as shown in FIG. 7 maybe exchanged for an input circuit section 11A according to the second embodiment as shown in FIG. 3. Similarly, the input circuit section 11B according to the fifth embodiment as shown in FIG. 9 maybe exchanged for the input circuit section 11A as shown in FIG. 3.

What is claimed is:

1. A multi-outputting switching power supply circuit comprising:

a main-output circuit section; and at least one sub-output circuit section, wherein said at least one sub-output circuit section is controlled by a magnetic amplifier for amplifying electric power magnetically and said main-output circuit section includes a synchronous rectifying circuit comprising a MOS transistor controlled by a voltage drop across a substantially non-resistive element in said rectifying circuit, thereby allowing a dummy load to be omitted from said rectifying circuit.

2. A multi-outputting switching power supply circuit comprising:

a main-output circuit section having a smoothing choke to store energy during a first period of time; and at least one sub-output circuit section controlled by a magnetic amplifier for amplifying electric power magnetically, wherein said main-output circuit section includes a synchronous rectifying circuit comprising a MOS transistor switched on by a voltage within said rectifying circuit during a second period of time to allow a portion of said stored energy to discharge, thereby allowing a dummy load to be omitted from said rectifying circuit.

3. A multi-outputting switching power supply circuit comprising:

a direct current power supply section for producing a direct current input voltage;

a switching circuit for producing, by controlling said direct current input voltage for an ON or an OFF state based on an input control signal, a first alternating current voltage having a fixed frequency controlled based on said control signal and a pulse width corresponding to said control signal;

a transformer for producing, by transforming said first alternating current voltage, a second alternating current voltage with a fixed voltage value and at least one third alternative current voltage;

a first rectifying circuit for producing, by rectifying said second alternating current voltage, a first pulsating voltage;

a first smoothing circuit for producing, by smoothing said first pulsating voltage, a first direct output voltage so as to supply said first direct current voltage to a load;

a voltage change detecting circuit for producing, by detecting a change of said first direct current output voltage, a detective signal;

a controlling circuit for producing said control signal to control a pulse width of said first alternating current voltage for negative feed-back according to a level of said detective signal;

at least one magnetic amplifier for producing a fourth alternating current voltage for producing, by controlling said third alternating current voltage for an ON or and OFF state based on said reset electric current, a fourth alternating current voltage with a pulse width corresponding to a reset electric current;

at least one second rectifying circuit for producing, by rectifying said fourth alternating current voltage, a second pulsating voltage;

at least one second smoothing circuit for producing, by smoothing said pulsating voltage, a second direct current output voltage so as to supply said second direct current output voltage to a load; and at least one voltage controlling circuit for producing, by detecting a change of said second direct current output voltage, said reset electric current to control said fourth alternating current voltage for negative feed-back, wherein said first rectifying circuit includes a switching circuit for producing said first pulsating voltage by controlling said second alternating current voltage for an ON or an OFF state, synchronizing with a timing of switching in said switching circuit.

4. The multi-outputting switching power supply circuit according to claim 3, wherein said switching circuit is provided with a MOS transistor for producing, by controlling said second alternating current voltage for said ON or said OFF state, synchronizing with a change of polarity of said second alternating current voltage, said first pulsating voltage.

5. The multi-outputting switching power supply according to claim 3, wherein said transformer includes an auxiliary winding for producing controlling voltage to control said switching circuit for an ON or an OFF state.

6. The multi-outputting switching power supply circuit according to claim 3, wherein said third alternating current voltage has a necessary pulse width to saturate said magnetic amplifier.

7. The multi-outputting switching power supply according to claim 4, wherein said transformer includes an auxiliary winding for producing controlling voltage to control said switching circuit for an ON or an OFF state.

8. The multi-outputting switching power supply circuit according to claim 4, wherein said third alternating current voltage has a necessary pulse width to saturate said magnetic amplifier.

9. A multi-outputting switching power supply circuit comprising:

a direct current power supply section for producing a direct current input voltage;

a switching circuit for producing, by controlling said direct current input voltage for an ON or OFF state based on said input control signal, a first alternating current voltage having a fixed frequency controlled by a control signal and a pulse width corresponding to said control signal;

a transformer for producing, by transforming said first alternating voltage, a second alternating current voltage with a fixed voltage value and at least one third alternating current voltage;

a first rectifying circuit for producing, by rectifying said second alternating current voltage, a first pulsating voltage;

a first smoothing circuit for producing, by smoothing said first pulsating voltage, a first direct current output voltage so as to supply said first direct current output voltage to a load;

a voltage change detecting circuit for producing, by detecting a change of said first direct current output voltage, a detecting signal;

a controlling circuit for producing said control signal to control a pulse width of said first alternating current voltage for negative feed-back based on a level of said detective signal;

at least one magnetic amplifier for producing, by controlling said third alternating current voltage for an ON or an OFF state based on said reset electric current, a fourth alternating current voltage with a pulse width corresponding to a reset electric current;

at least one rectifying circuit for producing, by rectifying said fourth alternating current, a second pulsating voltage;

at least one smoothing circuit for producing, by smoothing said second pulsating voltage, a second direct current output voltage so as to supply said second direct current output voltage to a load; and at least one voltage controlling circuit for producing, by detecting a change of said second direct current output voltage, said reset electric current to control said fourth alternating current voltage for negative feed-back, wherein said first rectifying circuit is provided with a first switching circuit for producing, by controlling said second alternating current voltage for an ON or an OFF state, synchronizing with a timing of switching in said switching circuit, said first pulsating voltage, wherein said first smoothing circuit is provided with a smoothing capacitor for producing, by smoothing said first pulsating voltage, said first direct current output voltage, so as to supply said first direct current output voltage, so as to supply said first direct current output voltage to a load, a choke coil for storing an electromagnetic energy caused by said pulsating voltage, a second switching circuit supplying said electromagnetic energy stored in said choke coil to said smoothing capacitor by becoming in an ON state when said first switching circuit is in and OFF state.

10. The multi-outputting switching power supply circuit according to claim 9, wherein said first and second switching circuit are made up-of a MOS transistor.

11. The multi-outputting switching power supply according to claim 9, wherein said transformer includes an auxiliary winding for producing controlling voltage to control said first and second switching circuit for an ON or an OFF state.

12. The multi-outputting switching power supply circuit according to claim 9, wherein said third alternating current voltage has a necessary pulse width to saturate said magnetic amplifier.

13. The multi-outputting switching power supply according to claim 10, wherein said transformer includes an auxiliary winding for producing controlling voltage to control said first and second switching circuit for an ON or an OFF state.

14. The multi-outputting switching power supply circuit according to claim 10, wherein said third alternating current voltage has a necessary pulse width to saturate said magnetic amplifier.

15. A multi-outputting switching power supply circuit comprising:
- a direct current power supply section for producing a direct current input voltage;
- a switching circuit for producing, by controlling said direct current input voltage for an ON or OFF state based on said input control signal, a first alternating current voltage having a fixed frequency controlled by a control signal and a pulse width corresponding to said control signal;
- a transformer for producing, by transforming said first alternating current voltage, a second alternating current voltage with a fixed voltage value and at least one third alternating current voltage;
- an active clamp circuit for resetting a core of said transformer by flowing an excitation current through a primary winding of said transformer while said switching circuit is in said OFF state;
- a first rectifying circuit for producing a first pulsating voltage by rectifying said second alternating current voltage;
- a first smoothing circuit for producing, by smoothing said first pulsating voltage, a first direct current output voltage so as to supply said first direct current output voltage to a load;
- a voltage change detecting circuit for producing, by detecting a change of said first direct current output voltage, a detective signal;
- a controlling circuit for producing said control signal to control a pulse width of said first alternating current voltage for negative feed-back based on a level of said detective signal;
- at least one magnetic amplifier for producing, by controlling said third alternating electric current for an ON or an OFF state based on said reset electric current, a fourth alternating current voltage with a pulse width corresponding to a reset electric current;
- at least one second rectifying circuit for producing, by rectifying said fourth alternating current voltage, a second pulsating voltage;
- at least one smoothing circuit for producing, by smoothing said second pulsating voltage, a second pulsating voltage so as to supply said second direct current output voltage to a load; and
- at least one voltage controlling circuit for producing, by detecting a change of said second direct current output voltage, said reset electric current to control said fourth alternating current voltage for negative feed-back,
- wherein said first rectifying circuit is provided with a first switching circuit for producing, by controlling said second alternating current voltage for an ON or an OFF state, synchronizing with a timing of switching in said switching circuit, said first pulsating voltage and wherein said first smoothing circuit is provided with a smoothing capacitor for producing, by smoothing said first pulsating voltage, said first direct current output voltage, so as to supply said first direct current output voltage to a load, a choke coil for storing an electromagnetic energy caused by said first pulsating voltage and a second switching circuit supplying said electromagnetic energy stored in said choke coil to said smoothing capacitor by becoming in an ON state when said first switching circuit is in an OFF state.

16. The multi-outputting switching power supply circuit according to claim 15, wherein said first and second switching circuit are made up of a MOS transistor.

17. The multi-outputting switching power supply according to claim 15, wherein said transformer includes an auxiliary winding for producing controlling voltage to control said first and second switching circuit for an ON or an OFF state.

18. The multi-outputting switching power supply circuit according to claim 15, wherein said third alternating current voltage has a necessary pulse width to saturate said magnetic amplifier.

19. The multi-outputting switching power supply according to claim 16, wherein said transformer includes an auxiliary winding for producing controlling voltage to control said first and second switching circuit for an ON or an OFF state.

20. The multi-outputting switching power supply circuit according to claim 16, wherein said third alternating current voltage has a necessary pulse width to saturate said magnetic amplifier.

21. A multi-outputting switching power supply circuit comprising:
- a direct current power supply section for producing a direct current input voltage;
- a switching circuit for producing, by controlling said direct current input voltage for an ON or OFF state based on said input control signal, two or more first alternating current voltages having a fixed frequency controlled by a control signal and a pulse width corresponding to said control signal;
- a plurality of transformers for producing, by transforming said first alternating current voltage, a second alternating current voltage with a fixed voltage value and at least one third alternating current voltage;
- a first rectifying circuit for producing, by rectifying said second alternating current voltage, a first pulsating voltage;
- a first smoothing circuit for producing, by smoothing said first pulsating voltage, a first direct current output, so as to supply said first direct current output voltage to a load;
- a voltage change detecting circuit for producing, by detecting a change of said first direct current output voltage, a detective signal;
- a controlling circuit for producing said control signal to control a pulse width of said first alternating current voltage for negative feed-back based on a level of said detective signal;
- at least one magnetic amplifier for producing a fourth alternating current voltage with a pulse width corresponding to a reset electric current by controlling said third alternating current voltage for an ON or an OFF state based on said reset electric current;
- at least one second rectifying circuit for producing, by rectifying said fourth alternating current voltage, a second pulsating voltage;
- at least one smoothing circuit for producing, by rectifying said second pulsating voltage, a second direct current output voltage so as to supply said second direct current output voltage to a load; and
- at least one voltage controlling circuit for producing, by detecting a change of said second direct current output voltage, said reset electric current to control said second alternating current voltage for negative feed-back,
- wherein said first rectifying circuit includes a switching circuit for producing said first pulsating voltage by controlling said second alternating current voltage for an ON or an OFF state, synchronizing with a timing of switching in said switching circuit.

22. The multi-outputting switching power supply circuit according to claim 21, wherein said switching circuit is made up of a MOS transistor for producing said first pulsating voltage by controlling said second alternating current voltage for an ON or an OFF state, synchronizing with a change of polarity of said second alternating current voltage.

23. The multi-outputting switching power supply according to claim 21, wherein said transformer includes an auxiliary winding for producing controlling voltage to control said switching circuit for an ON or an OFF state.

24. The multi-outputting switching power supply circuit according to claim 21, wherein said third alternating current voltage has a necessary pulse width to saturate said magnetic amplifier.

25. The multi-outputting switching power supply according to claim 22, wherein said transformer includes an auxiliary winding for producing controlling voltage to control said switching circuit for an ON or an OFF state.

26. The multi-outputting switching power supply circuit according to claim 22, wherein said third alternating current voltage has a necessary pulse width to saturate said magnetic amplifier.

27. The multi-outputting switching power supply circuit according to claim 5, wherein said third alternating current voltage has a necessary pulse width to saturate said magnetic amplifier.

28. The multi-outputting switching power supply circuit according to claim 11, wherein said third alternating current voltage has a necessary pulse width to saturate said magnetic amplifier.

* * * * *